US010529314B2

(12) United States Patent
Tamura et al.

(10) Patent No.: US 10,529,314 B2
(45) Date of Patent: Jan. 7, 2020

(54) SPEECH SYNTHESIZER, AND SPEECH SYNTHESIS METHOD AND COMPUTER PROGRAM PRODUCT UTILIZING MULTIPLE-ACOUSTIC FEATURE PARAMETERS SELECTION

(71) Applicant: Kabushiki Kaisha Toshiba, Minato-ku, Tokyo (JP)

(72) Inventors: Masatsune Tamura, Kawasaki Kanagawa (JP); Masahiro Morita, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/434,440

(22) Filed: Feb. 16, 2017

(65) Prior Publication Data
US 2017/0162186 A1 Jun. 8, 2017

Related U.S. Application Data

(63) Continuation of application No. PCT/JP2014/074844, filed on Sep. 19, 2014.

(51) Int. Cl.
*G10L 13/027* (2013.01)
*G10L 13/047* (2013.01)
(Continued)

(52) U.S. Cl.
CPC .......... *G10L 13/027* (2013.01); *G10L 13/047* (2013.01); *G10L 13/08* (2013.01); *G06F 17/2755* (2013.01); *G10L 13/10* (2013.01)

(58) Field of Classification Search
CPC ......... G10L 13/06; G10L 13/07; G10L 13/08; G10L 13/10; G10L 13/027
(Continued)

(56) References Cited

U.S. PATENT DOCUMENTS 6,266,637 B1 * 7/2001 Donovan ................ G10L 13/06
704/258
7,848,924 B2 * 12/2010 Nurminen ............ G10L 13/033
704/222
(Continued)

FOREIGN PATENT DOCUMENTS

JP 2003-241776 8/2003
JP 2004-233774 8/2004
(Continued)

OTHER PUBLICATIONS

Kataoka, Shunsuke, et al. "Decision-tree backing-off in HMM-based speech synthesis." Eighth International Conference on Spoken Language Processing. 2004, pp. 1-4.*
(Continued)

*Primary Examiner* — James S Wozniak
(74) *Attorney, Agent, or Firm* — Knobbe, Martens, Olson & Bear, LLP

(57) ABSTRACT

A speech synthesizer includes a statistical-model sequence generator, a multiple-acoustic feature parameter sequence generator, and a waveform generator. The statistical-model sequence generator generates, based on context information corresponding to an input text, a statistical model sequence that comprises a first sequence of a statistical model comprising a plurality of states. The multiple-acoustic feature parameter sequence generator, for each speech section corresponding to each state of the statistical model sequence, selects a first plurality of acoustic feature parameters from a first set of acoustic feature parameters extracted from a first speech waveform stored in a speech database and generates a multiple-acoustic feature parameter sequence that comprises a sequence of the first plurality of acoustic feature parameters. The waveform generator generates a distribution sequence based on the multiple-acoustic feature parameter sequence and generates a second speech waveform
(Continued)

based on a second set of acoustic feature parameters generated based on the distribution sequence.

15 Claims, 15 Drawing Sheets

(51) Int. Cl.
*G10L 13/08* (2013.01)
*G10L 13/07* (2013.01)
*G10L 13/10* (2013.01)
*G06F 17/27* (2006.01)

(58) Field of Classification Search
USPC .................................. 704/260, 266
See application file for complete search history.

(56) References Cited

U.S. PATENT DOCUMENTS

| | | | | |
|---|---|---|---|---|
| 8,571,871 | B1* | 10/2013 | Stuttle | G10L 13/033 704/260 |
| 2005/0137870 | A1 | 6/2005 | Mizutani et al. | |
| 2008/0195381 | A1* | 8/2008 | Soong | G10L 25/48 704/200 |
| 2008/0312931 | A1 | 12/2008 | Mizutani et al. | |
| 2009/0048841 | A1* | 2/2009 | Pollet | G10L 13/07 704/260 |
| 2009/0157408 | A1 | 6/2009 | Kim | |
| 2010/0057467 | A1* | 3/2010 | Wouters | G10L 13/07 704/267 |
| 2010/0066742 | A1* | 3/2010 | Qian | G10L 13/10 345/440.1 |
| 2011/0054903 | A1* | 3/2011 | Yan | G10L 13/08 704/260 |
| 2012/0053933 | A1 | 3/2012 | Tamura et al. | |
| 2012/0059654 | A1* | 3/2012 | Nishimura | G10L 13/02 704/243 |
| 2012/0123782 | A1* | 5/2012 | Wilfart | G10L 13/04 704/264 |
| 2012/0143611 | A1* | 6/2012 | Qian | G10L 13/07 704/260 |
| 2012/0265534 | A1* | 10/2012 | Coorman | G10L 13/033 704/265 |
| 2013/0117026 | A1* | 5/2013 | Kato | G10L 13/08 704/260 |
| 2013/0211839 | A1* | 8/2013 | Kato | G10L 13/08 704/262 |
| 2013/0218568 | A1* | 8/2013 | Tamura | G10L 13/033 704/260 |
| 2013/0262087 | A1* | 10/2013 | Ohtani | G06F 17/28 704/9 |
| 2015/0127349 | A1* | 5/2015 | Agiomyrgiannakis | G10L 15/142 704/266 |
| 2016/0140953 | A1* | 5/2016 | Kwon | G10L 13/047 704/260 |
| 2016/0300564 | A1* | 10/2016 | Nasu | G10L 13/06 |
| 2017/0162186 | A1* | 6/2017 | Tamura | G10L 13/027 |

FOREIGN PATENT DOCUMENTS

| | | |
|---|---|---|
| JP | 4080989 | 4/2008 |
| JP | 4167084 | 10/2008 |
| JP | 5085700 | 11/2012 |
| JP | 2013-057735 | 3/2013 |
| JP | 2013-117638 | 6/2013 |

OTHER PUBLICATIONS

Ling, Zhen-Hua, et al. "HMM-based unit selection using frame sized speech segments." Ninth International Conference on Spoken Language Processing. Sep. 2006, pp. 2034-2037.*

Masuko, Takashi, et al. "Speech synthesis using HMMs with dynamic features." Acoustics, Speech, and Signal Processing, 1996. ICASSP-96. Conference Proceedings., 1996 IEEE International Conference on. vol. 1. IEEE, May 1996, pp. 389-392.*

Tokuda, Keiichi, et al. "Speech parameter generation from HMM using dynamic features." Acoustics, Speech, and Signal Processing, 1995. ICASSP-95., 1995 International Conference on. vol. 1. IEEE, May 1995, pp. 660-663.*

Tokuda, Keiichi, et al. "Speech synthesis based on hidden Markov models." Proceedings of the IEEE 101.5, Jan. 2013, pp. 1-17.*

Tokuda, Keiichi, et al. "Speech parameter generation algorithms for HMM-based speech synthesis." Acoustics, Speech, and Signal Processing, 2000. ICASSP'00. Proceedings. 2000 IEEE International Conference on. vol. 3. IEEE, Jun. 2000, pp. 1315-1318.*

Wu, Yi-Jian, et al. "Minimum generation error training for HMM-based speech synthesis." Acoustics, Speech and Signal Processing, 2006. ICASSP 2006 Proceedings. 2006 IEEE International Conference on. vol. 1. IEEE, May 2006, pp. 89-92.*

Zen, Heiga, et al. "Statistical parametric speech synthesis." Speech Communication 51.11, Nov. 2009, pp. 1-23.*

Zen, Heiga, et al. "An introduction of trajectory model into HMM-based speech synthesis." Fifth ISCA Workshop on Speech Synthesis. Jun. 2004, pp. 191-196.*

International Search Report dated Dec. 22, 2014 in PCT Application No. PCT/JP2014/074844, 4 pgs.

Tokuda et al., "Speech Synthesis Based on Hidden Markov Models," Proceedings of the IEEE, vol. 101, Issue 5, May 2013 in 19 pages.

* cited by examiner

SPEECH SYNTHESIZER, AND SPEECH SYNTHESIS METHOD AND COMPUTER PROGRAM PRODUCT UTILIZING MULTIPLE-ACOUSTIC FEATURE PARAMETERS SELECTION

CROSS-REFERENCE TO RELATED APPLICATIONS

This application is a continuation of PCT International Application No. PCT/JP2014/074844, filed on Sep. 19, 2014; the entire contents of which are incorporated herein by reference.

FIELD

The present invention relates to a speech synthesizer, a speech synthesis method, and a computer program product.

BACKGROUND

Speech synthesizers that generate synthesized speech corresponding to an input text have been known. As one of the conventional speech synthesizers, there has been a waveform-concatenation based speech synthesizer that synthesizes a speech by preparing a database of a large amount of speech waveforms, selecting speech elements from the speech waveform database in accordance with the input text, and concatenating the selected speech elements. Furthermore, a multiple-segment selecting speech synthesizer that enhanced a sense of stability by selecting a plurality of speech segments for each section and generating a speech waveform from the selected speech elements has also been known. In such waveform-concatenation based speech synthesizers, in a properly selected section, a high quality synthesized speech that is like a recorded speech can be obtained. However, the decrease in naturalness due to mismatch between the selected speech segment and prosody, and distortion caused by discontinuity of the adjacent speech segments arise as a problem.

Meanwhile, as a statistical model-based speech synthesizer, an HMM-based speech synthesizer that trains a hidden Markov model (HMM) from acoustic feature parameters that are obtained from the speech database by analysis and synthesizes a speech based on the HMM that was trained has been proposed and been used widely. In the HMM-based speech synthesis, a speech is synthesized by obtaining a distribution sequence in accordance with the input text, and generating feature parameters from the obtained distribution sequence. However, as a problem in the HMM speech synthesis, due to synthesizing speech from the averaged feature parameters, it includes the occurrence of over-smoothing that results in a synthesized speech of unnatural sound quality.

DETAILED DESCRIPTION

An according to one embodiment, a speech synthesizer includes a statistical-model sequence generator, a multiple-acoustic feature parameter sequence generator, and a waveform generator. The statistical-model sequence generator generates, based at least in part on context information corresponding to an input text, a statistical model sequence that comprises a first sequence of a statistical model comprising a plurality of states. The multiple-acoustic feature parameter sequence generator, for each speech section corresponding to each state of the statistical model sequence, selects a first plurality of acoustic feature parameters from a first set of acoustic feature parameters extracted from a first speech waveform stored in a speech database and generates a multiple-acoustic feature parameter sequence that comprises a sequence of the first plurality of acoustic feature parameters. The waveform generator generates a distribution sequence based at least in part on the multiple-acoustic feature parameter sequence and generates a second speech waveform based at least in part on a second set of acoustic feature parameters generated based at least in part on the distribution sequence.

with reference to the accompanying drawings, the following describes in detail a speech synthesizer, a speech synthesis method, and a computer program in exemplary embodiments, with an example that uses a hidden Markov model (HMM) as a statistical model.

First Embodiment

Figure 1:
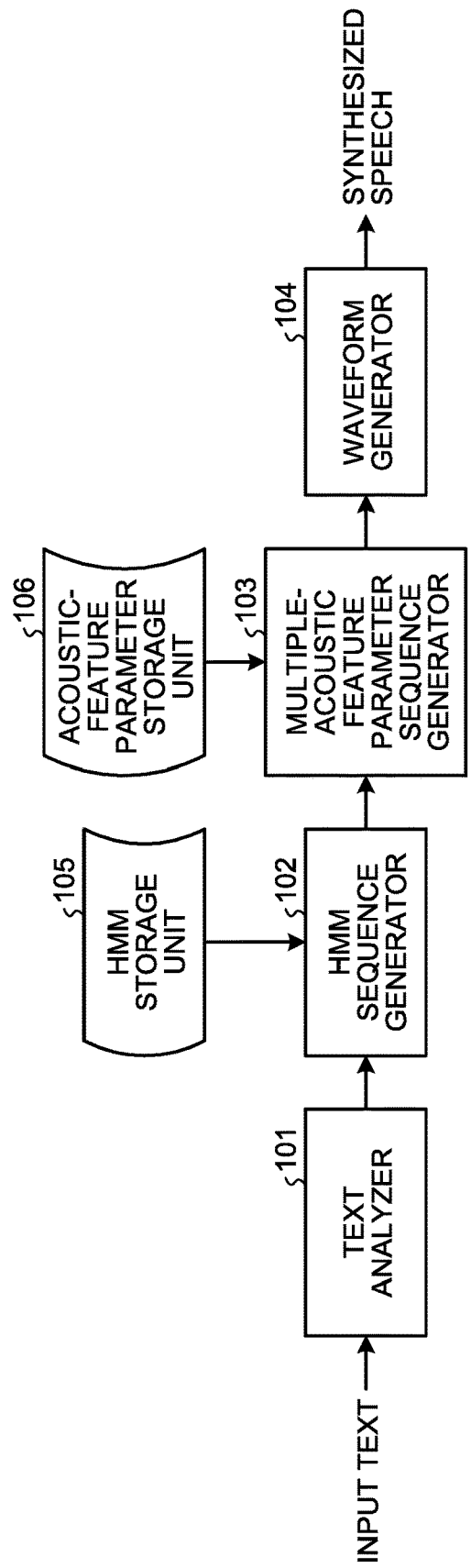
FIG. 1 is a block diagram illustrating an example of a configuration of a speech synthesizer.

FIG. 1 is a block diagram illustrating an example of a configuration of a speech synthesizer according to a first embodiment. The speech synthesizer in the first embodiment, as illustrated in FIG. 1, includes a text analyzer 101, an HMM sequence generator 102, a multiple-acoustic feature parameter sequence generator 103, a waveform generator 104, an HMM storage unit 105, and an acoustic-feature parameter storage unit 106.

The text analyzer 101 generates, by text analysis for input text, context information corresponding to the input text. For example, the text analyzer 101 performs morphological analysis on the input text, obtains linguistic information such as pronunciation information (phoneme sequence) and accent information required for speech synthesis, and based on the obtained phoneme sequence and linguistic information, generates context information corresponding to the input text. The text analyzer 101 may generate the context information corresponding to the input text, based on phoneme sequence and accent information that are prepared with manual correction.

The context information is the information representing the phonetic and linguistic attributes of information used as a unit for classifying the model of HMM such as a phoneme, a semi-phoneme, and a syllable. For example, when the phoneme is used as a phonetic unit, a sequence of phoneme names can be used as the context information. Furthermore, it is possible to use the context information including triphone in which a preceding phoneme and a subsequent phoneme are added; phoneme information that includes two previous and subsequent phonemes each; phoneme type information that represents classification by voiced sound and unvoiced sound and represents an attribute of further detailed phoneme type; and linguistic attribute information such as the information on the position of each phoneme in a sentence, in a breath group, and in an accent phrase; the mora number and accent type of an accent phrase; the position up to an accent nucleus; and rising intonation.

The HMM sequence generator 102 refers to the HMM storage unit 105 and, based on the context information obtained by the processing of the text analyzer 101, generates an HMM sequence corresponding to the input text. The hidden Markov model (HMM) is widely known as one of the statistical models available for speech synthesis. The HMM sequence is a sequence in which HMMs that correspond to respective speech units are connected in a time direction in accordance with the sequence of speech units that the context information corresponding to the input text indicates.

Figure 2:
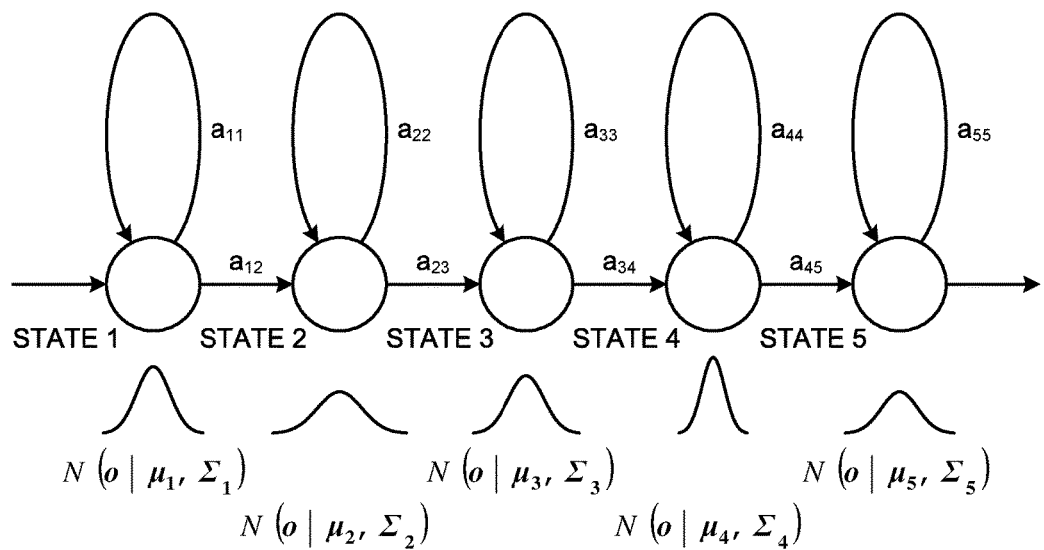
FIG. 2 is a diagram for explaining the configuration of an HMM.

The HMM includes a plurality of states and is a statistical model represented by the state transition probability and the output distribution of each state. When a left-to-right HMM is used as an HMM, as illustrated in FIG. 2, it is modeled by the output distribution $N(o|\mu_i,\Sigma_i)$ of each state and by the state transition probability $a_{ij}$ (i and j are state indexes), and is modeled in a form that only the transition probability to an adjacent state and the self-transition probability have values. The one that uses duration distribution in place of the self-transition probability is referred to as hidden semi-Markov model (HSMM) and is used in modeling the duration. However, in the first embodiment, the HSMM also is included and referred to as HMM.

Figure 3:
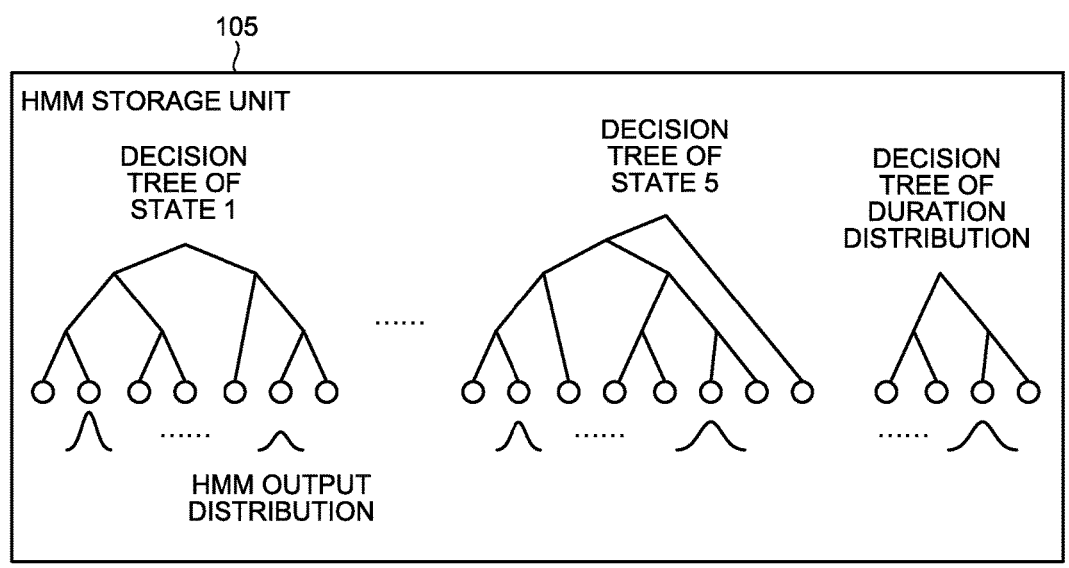
FIG. 3 is a diagram illustrating decision trees and distributions that an HMM storage unit stores therein.

The HMM sequence generator 102 generates, based on the HMM information stored in the HMM storage unit 105, an HMM sequence. The HMM storage unit 105 stores therein the output distributions of states of the HMMs, and the information that determines the output distribution of each state from the context information, as the HMM information. In the speech synthesis based on the HMM, a way to use a decision tree as the information to determine the output distribution is widely used. In that case, the output distribution is identified by a state clustering based on the decision tree when training the HMM stored in the HMM storage unit 105, and is identified by referring to the context information and traversing the decision tree when generating the HMM. In that case, in the HMM storage unit 105, as illustrated in FIG. 3, the decision trees that are the models of acoustic feature parameters in states of the HMMs and the output distributions of leaf nodes of the decision trees are stored, and the decision trees and the distributions to select the duration distributions are also stored. Each node of the decision tree is associated with questions to classify the distribution, for example, "whether it is silence", "whether it is a voiced sound", and "whether it is an accent nucleus", and the node is classified into a child node to which the question is relevant, or into a child node to which the question is not relevant.

The HMM sequence generator 102, by determining whether the question of each node is relevant to the context information obtained by the processing of the text analyzer 101, searches the decision tree and obtains a leaf node. Then, the HMM sequence generator 102, based on the distribution associated with the obtained leaf node as the output distribution of each state, constructs the HMM corresponding to each phonetic unit, and generates an HMM sequence that is a sequence of the HMMs corresponding to the context information on the input text.

Figure 4:
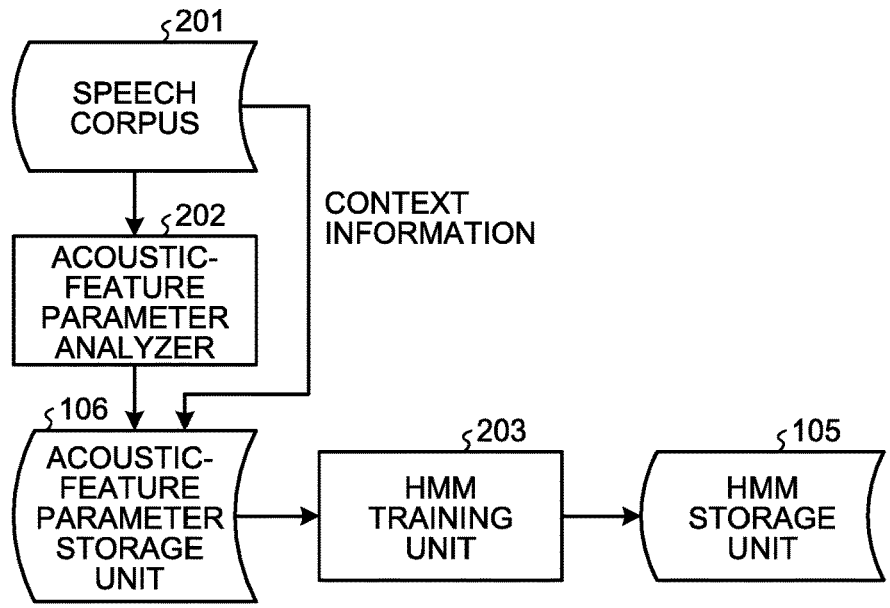
FIG. 4 is a diagram for explaining training of the HMM.

With reference to FIG. 4, the training of the HMM that the HMM storage unit 105 stores therein will be described. The HMM that the HMM storage unit 105 stores therein, as illustrated in FIG. 4, is trained based on the information that a speech corpus 201 (one example of a speech database) stores therein. The speech corpus 201 stores therein speech waveforms used for the training of models, and the context information corresponding to each speech waveform. The speech waveform is the prepared data that is cut for each sentence from the recorded voice of a speaker, and the context information is generated in advance from the uttered content of each recorded voice.

An acoustic-feature parameter analyzer 202 illustrated in FIG. 4 obtains acoustic feature parameters from speech waveform data that the speech corpus 201 stores therein. The acoustic feature parameters are feature parameters such as spectrum envelope parameters, excitation parameters, and prosodic feature parameters of the speech, which are obtained by analyzing the speech, and are extracted from the speech waveform data. As for the spectrum envelope parameter, the feature parameters representing the spectrum envelope such as mel-cepstrum, mel-LSP, and linear predictive coefficients are available. As for the excitation parameter, the band noise intensity (band aperiodicity (BAP)), which represents the rate of aperiodic components of each spectrum band, the phase information, or the group delay information can be used.

As for the speech analysis, the analysis by a fixed frame rate, pitch synchronous analysis, the parameters that pitch-synchronous analysis parameters are interpolated at a fixed frame rate, and the like can be used, for example. The analysis by a STRAIGHT method may be used.

As for the prosodic feature parameter, the prosodic parameter is extracted and used from each speech waveform in the speech corpus 201. The prosodic feature parameter is a feature parameter by pitch information representing intonation and changes in pitch of each phoneme and the duration representing the length, and the pitch information that is extracted from the speech waveform, the logarithmic fundamental frequency sequence that is obtained from the pitch information, the phoneme duration, and the state duration can be used. The pitch information is a parameter that only a voiced sound has a value. However, it may be used by applying a pitch obtained by interpolation to the section of unvoiced sound, or a symbol that represents the section of the unvoiced sound may be used as the parameter. The duration information on each phoneme added to the context information as the information on a phoneme boundary time can be used for the training of HMM. The parameters of the duration distribution may be obtained from the phoneme boundary time information that was input, and the maximum likelihood estimation may be made, like HSMM, based on the information that stochastically associates each state with a frame of feature parameters in the training of HMM.

The acoustic feature parameters obtained in the acoustic-feature parameter analyzer 202 are placed in and stored in the acoustic-feature parameter storage unit 106, together with the context information thereof, the time boundary information, and others. The acoustic feature parameters that the acoustic-feature parameter storage unit 106 stores therein are used as the training data of HMM in an HMM training unit 203 illustrated in FIG. 4. The acoustic feature parameters that the acoustic-feature parameter storage unit 106 stores therein are further used as candidate data of the acoustic feature parameters that the multiple-acoustic feature parameter sequence generator 103, which will be described later, selects.

The HMM training unit 203 illustrated in FIG. 4 trains the HMM based on the acoustic feature parameters and the context information that the acoustic-feature parameter storage unit 106 stores therein. The training of HMM can be performed by the training of a speaker-dependent model, or the training of a speaker-adaptive model.

Figure 5:
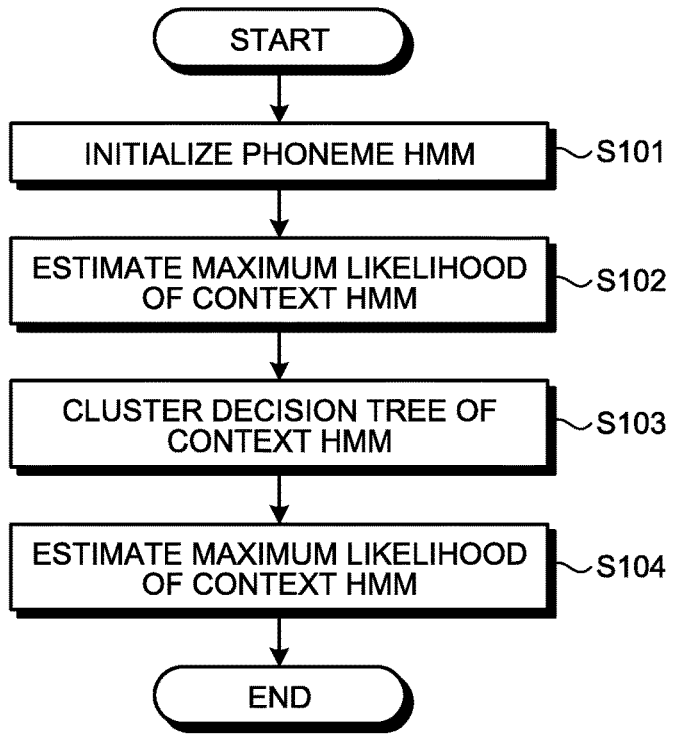
FIG. 5 is a flowchart illustrating a processing procedure of HMM training by the training of a speaker-dependent model.

FIG. 5 is a flowchart illustrating a processing procedure when performing the training of HMM by the training of a speaker-dependent model. In the case of this example, at Step S101, as the same as that in the model training of the HMM speech synthesis, the HMM training unit 203 first initializes phoneme HMM. Then, at Step S102, the HMM training unit 203 performs maximum likelihood estimation on the HMM corresponding to each of the context information that was initialized by phoneme HMM. Then, at Step S103, the HMM training unit 203 applies a clustering method by decision tree and trains the output distribution of each state, the decision tree of state duration distribution, and the distribution of leaf nodes thereof. Subsequently, at Step S104, the HMM training unit 203 updates the obtained model by the maximum likelihood estimation, and stores the obtained HMM information into the HMM storage unit 105. Thus, an HMM that maximizes the likelihood for the training data can be generated.

Figure 6:
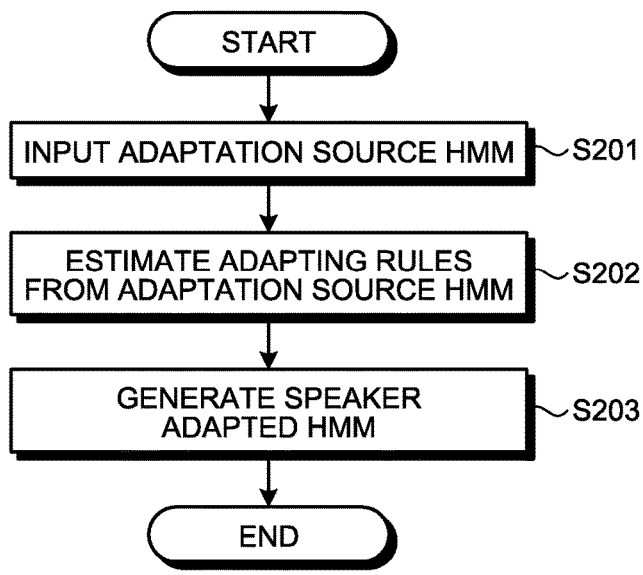
FIG. 6 is a flowchart illustrating the processing procedure of HMM training by the training of a speaker-adaptive model.

FIG. 6 is a flowchart illustrating a processing procedure when performing the training of HMM by the training of a speaker-adaptive model. In the case of this example, as illustrated in FIG. 6, at Step S201, the HMM training unit 203 first inputs an adaptation source HMM to be the original of conversion. Then, at Step S202, the HMM training unit 203 estimates, from the adaptation source HMM, the rules for adapting to the speaker of the speech corpus. Subsequently, at Step S203, the HMM training unit 203 generates a speaker-adapted HMM by converting the adaptation source HMM by the rules estimated at Step S202, and stores the HMM information into the HMM storage unit 105. When using a model of averaged voice that is produced from a plurality of speakers as an adaptation source model and using a maximum likelihood linear regression (MLLR) as an adaptation method, the regression matrix that converts the speaker individuality is obtained at Step S202, and by applying the obtained regression matrix at Step S203, an adapted HMM of a target speaker is generated. As for the speaker adaptation technologies, other speaker adaptation methods such as MAP estimation, eigenvoice, and cluster adaptive training can be used. Thus, the HMM of the target speaker can be generated even from a small amount of speech corpus. Furthermore, as long as it is the method for training the HMM model corresponding to the acoustic feature parameters used for training, the methods such as a method by the interpolation of the model can be used, other than the speaker-dependent model or the speaker-adapted model, for example.

In the conventional speech synthesis based on the HMM, the HMM sequence is generated according to the context information corresponding to the input text, and by generating the acoustic feature parameters from this HMM sequence, the waveform generation is performed. Because of this, the waveform generation is to be made from the averaged acoustic feature parameters and the over-smoothing occurs, and thus there is the problem that it results in a synthesized speech of unnatural sound quality.

In contrast, in the speech synthesizer in the first embodiment, the HMM sequence is generated according to the context information corresponding to the input text, and based on this HMM sequence, in the multiple-acoustic feature parameter sequence generator 103 which will be described later, a plurality of acoustic feature parameters are selected for each speech section corresponding to each state of the HMM sequence, and a multiple-acoustic feature parameter sequence in which the acoustic feature parameters that were selected for each speech section are concatenated in the time direction is generated. Then, a distribution sequence is generated from the generated multiple-acoustic feature parameter sequence, and by generating acoustic feature parameters from the distribution sequence, the waveform generation is performed. Thus, the over-smoothing that occurs in the HMM speech synthesis can be suppressed, and it makes it possible to achieve the voice synthesis of a natural and realistic voice feeling.

Furthermore, in the speech synthesizer of the first embodiment, being different from the conventional speech synthesizer (see Japanese Patent No. 4080989) that selects and concatenates a plurality of speech elements, the speech synthesis is performed based on the distribution of acoustic feature parameters. Thus, it makes it possible to perform the speech synthesis in which the statistical features of the training data are appropriately reflected, and it makes it possible also to perform the waveform generation and the smoothing processing in not the waveform domain in which the processing is difficult but the domain of acoustic feature parameters. That is, in the speech synthesizer in the first embodiment, because the waveform generation is performed from the optimal sequence of each of the prosodic feature parameters, the spectrum envelope parameters, and the excitation parameters, a maximum likelihood sequence for the HMM sequence can be generated, and that makes it possible to apply, in the smoothing, feature parameter generation algorithm using static and dynamic feature parameters that is used in speech synthesis based on the HMM. Accordingly, it is possible to generate the acoustic feature parameters for which the distribution of the static and dynamic feature parameters of each speech section is reflected and that properly reproduce the changes of the acoustic feature parameters over time.

Furthermore, there has been a conventional technology that selects the optimal acoustic feature parameters for each speech section based on the HMM sequence (see Japanese Patent Application Laid-open No. 2013-117638). However, in the method that simply selects the optimal acoustic feature parameters for each speech section, the degradation in sound quality arises by the distortion due to the discontinuity in the concatenation and by the mismatch of context. Meanwhile, in the speech synthesizer in the first embodiment, a multiple-acoustic feature parameter sequence is generated by selecting a plurality of acoustic feature parameters for each speech section based on the HMM sequence, a distribution sequence is generated from this multiple-acoustic feature parameter sequence, and the waveform generation is performed by generating the acoustic feature parameters from the distribution sequence. Thus, this makes it possible to perform the stable speech synthesis that reduces the degradation in sound quality due to the discontinuity distortion or the mismatch of context as concerned in the conventional technology. That is, according to the speech synthesizer of the first embodiment, after the consideration of the trade-off between the synthesized speech that is over-smoothed and results in unnatural sound quality and the synthesized speech that has realistic voice feeling even though the mismatch arises, the balanced speech synthesis for which the statistical features of the acoustic feature parameters are reflected can be performed, and that makes it possible to create a natural and smooth synthetic speech.

The multiple-acoustic feature parameter sequence generator 103 selects, based on the HMM sequence generated by the HMM sequence generator 102, a plurality of acoustic feature parameters for each speech section corresponding to each state of the HMM sequence, out of the acoustic feature parameters that the acoustic-feature parameter storage unit 106 stores therein, and generates a multiple-acoustic feature parameter sequence.

Figure 7:
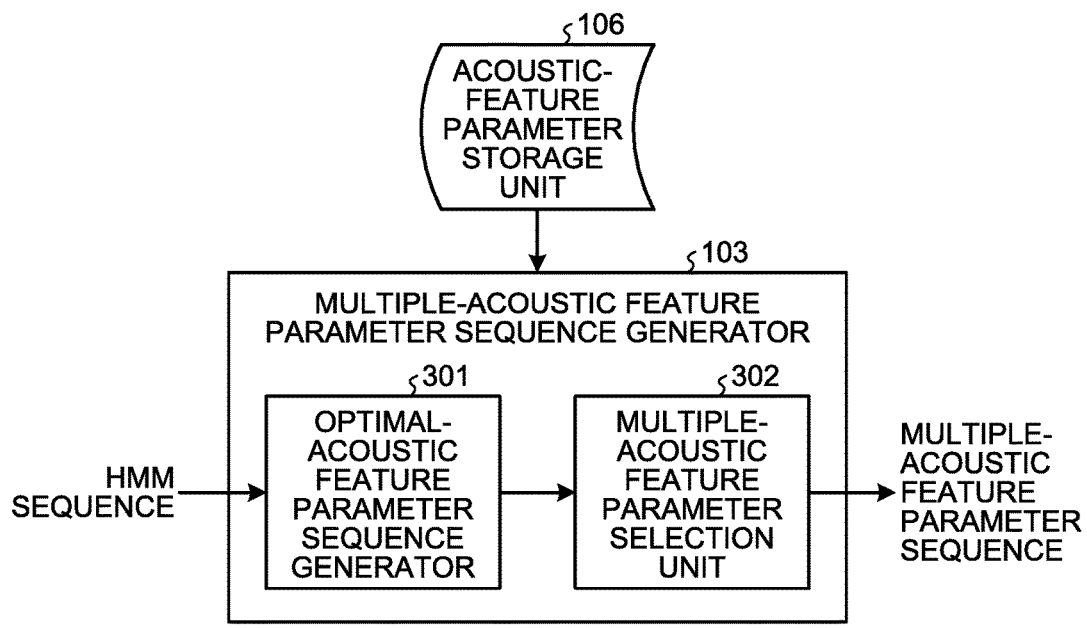
FIG. 7 is a block diagram illustrating an example of a configuration of a multiple-acoustic feature parameter sequence generator.

FIG. 7 illustrates an example of a configuration of the multiple-acoustic feature parameter sequence generator 103. The multiple-acoustic feature parameter sequence generator 103 illustrated in FIG. 7 includes an optimal-acoustic feature parameter sequence generator 301 and a multiple-acoustic feature parameter selection unit 302.

In the multiple-acoustic feature parameter sequence generator 103 illustrated in FIG. 7, the optimal-acoustic feature parameter sequence generator 301 first obtains, based on the HMM sequence generated by the HMM sequence generator 102, an optimal-acoustic feature parameter sequence corresponding to the input text. Then, the multiple-acoustic feature parameter selection unit 302 selects, out of the acoustic feature parameters that the acoustic-feature parameter storage unit 106 stores therein, a plurality of acoustic feature parameters, for each speech section, based on the obtained optimal-acoustic feature parameter sequence, and obtains a multiple-acoustic feature parameter sequence. While the units of selecting the acoustic feature parameters can be performed in any desired unit, it is assumed here that a plurality of acoustic feature parameters are selected for each state of the HMM sequence. In this case, in the acoustic-feature parameter storage unit 106, the information to which the boundary corresponding to the state is added is stored, together with each acoustic feature parameter of the speech waveform. The association between each state of the HMM and the speech waveform is obtained by the Viterbi alignment in advance, and the time boundary of the obtained maximum-likelihood state transition sequence is stored as a boundary of the state.

Figure 8:
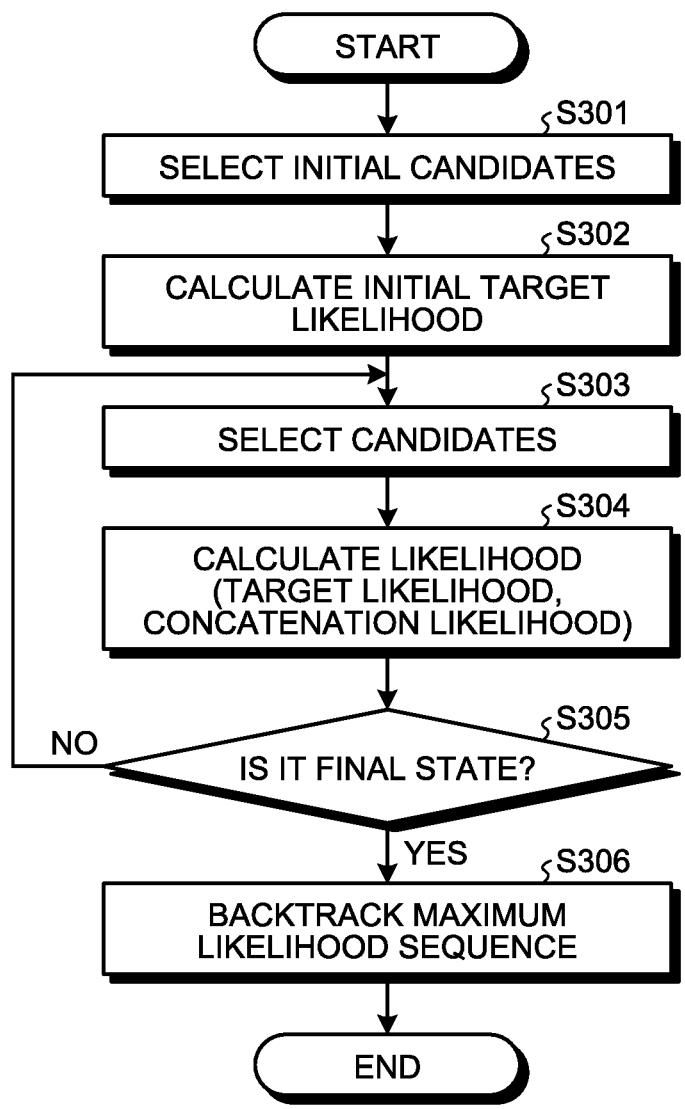
FIG. 8 is a flowchart illustrating a processing procedure of an optimal-acoustic feature parameter sequence generator.

The optimal-acoustic feature parameter sequence generator 301 generates an optimal-acoustic feature parameter sequence in units of a state of the HMM sequence by dynamic programming, when target likelihood and concatenation likelihood are used for the selection of the acoustic feature parameters. FIG. 8 is a flowchart illustrating a processing procedure of the optimal-acoustic feature parameter sequence generator 301 in this case.

The optimal-acoustic feature parameter sequence generator 301 first, at Step S301, selects candidates (initial candidates) of optimal acoustic feature parameters in the initial state of the HMM at the beginning of the HMM sequence, and at Step S302, calculates target likelihood (initial target likelihood) for each candidate. The target likelihood is a quantified degree of matching the target in the relevant speech section, and can be obtained from the likelihood of the distribution of the HMM sequence. When using logarithmic likelihood, it can be calculated as the sum of the logarithmic likelihood of the acoustic feature parameters in each speech section. The candidates of the optimal acoustic feature parameters are a set of acoustic feature parameters of the selection source, and the training data used in the training of the distribution of the leaf nodes of the decision tree in the state of the relevant HMM can be the candidates. The candidates can also be determined by other methods such as a method of defining as the candidates the acoustic feature parameters of the same phoneme corresponding to the same state, a method of defining as the candidates the same phoneme that is narrowed down by phonologic environment, and a method of determining the candidates by a matching degree of prosodic attributes.

The optimal-acoustic feature parameter sequence generator 301 then increments the state number by one, and at Step S303 and Step S304, performs the selection of candidates of the optimal acoustic feature parameters for each state, and the calculation of the likelihood thereof. The processing of Step S303 and Step S304 is repeated until the processing for the final state of the last HMM of the HMM sequence is completed (No at Step S305). Then, in order to perform backtracking, for each candidate of the selected optimal acoustic feature parameter, the information on the candidate of one previous state is stored. Note that, except for the last HMM of the HMM sequence, when the processing of the final state of an HMM was performed, the processing proceeds to the initial state of the subsequent HMM.

The processing of selecting the candidates of the optimal acoustic feature parameters at Step S303 can be performed as at Step S301. At Step S304, the calculation of concatenation likelihood is also performed, in addition to the calculation of target likelihood the same as at Step S301. The concatenation likelihood is a quantified matching degree of the relevant speech section as the section that follows the preceding section, or a quantified matching degree of the relevant speech section as the preceding section of the subsequent section. For example, in the case of the concatenation likelihood for a preceding section, the concatenation likelihood, for each candidate of the preceding section, uses the likelihood when each candidate was selected in the relevant state and uses a mean vector of each candidate in the subsequent section of the previous state as the mean vector, and the variance can be calculated by the likelihood of Gaussian distribution using the variance of the output distribution of each state.

When the processing for the final state of the last HMM in the HMM sequence is subsequently completed (Yes at Step S305), the optimal-acoustic feature parameter sequence generator 301, at Step S306, selects the acoustic feature parameters that maximize the likelihood at the final state of the last HMM in HMM sequence as the optimal acoustic feature parameters, and by performing the backtracking of the optimal acoustic feature parameters of the preceding states thereof in sequence, determines the optimal-acoustic feature parameter sequence. Then, the optimal-acoustic feature parameter sequence generator 301 delivers the optimal-acoustic feature parameter sequence generated as in the foregoing to the multiple-acoustic feature parameter selection unit 302.

Figure 9:
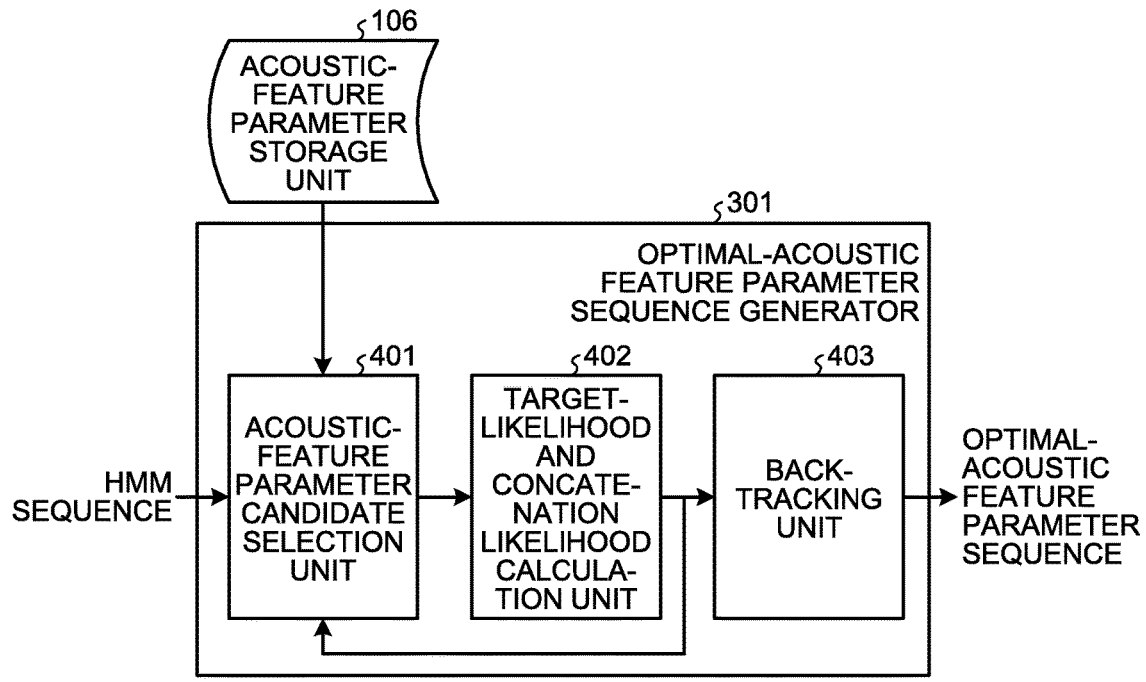
FIG. 9 is a block diagram illustrating an example of a configuration of the optimal-acoustic feature parameter sequence generator.

FIG. 9 illustrates an example of the configuration of the optimal-acoustic feature parameter sequence generator 301. The optimal-acoustic feature parameter sequence generator 301 illustrated in FIG. 9 includes an acoustic-feature parameter candidate selection unit 401, a target-likelihood and concatenation likelihood calculation unit 402, and a backtracking unit 403. In the optimal-acoustic feature parameter sequence generator 301 illustrated in FIG. 9, the candidates of the optimal acoustic feature parameters are selected in the acoustic-feature parameter candidate selection unit 401, and the calculation of the target likelihood and concatenation likelihood is performed in the target likelihood and concatenation likelihood calculation unit 402. The processing of these acoustic-feature parameter candidate selection unit 401 and the target-likelihood and concatenation likelihood calculation unit 402 is repeated with a state of the HMM sequence as a unit, and finally, the optimal-acoustic feature parameter sequence is generated in the backtracking unit 403.

The multiple-acoustic feature parameter selection unit 302 respectively selects, based on the optimal-acoustic feature parameter sequence generated by the optimal-acoustic feature parameter sequence generator 301, a plurality of acoustic feature parameters for each state of the HMM sequence.

Figure 10:
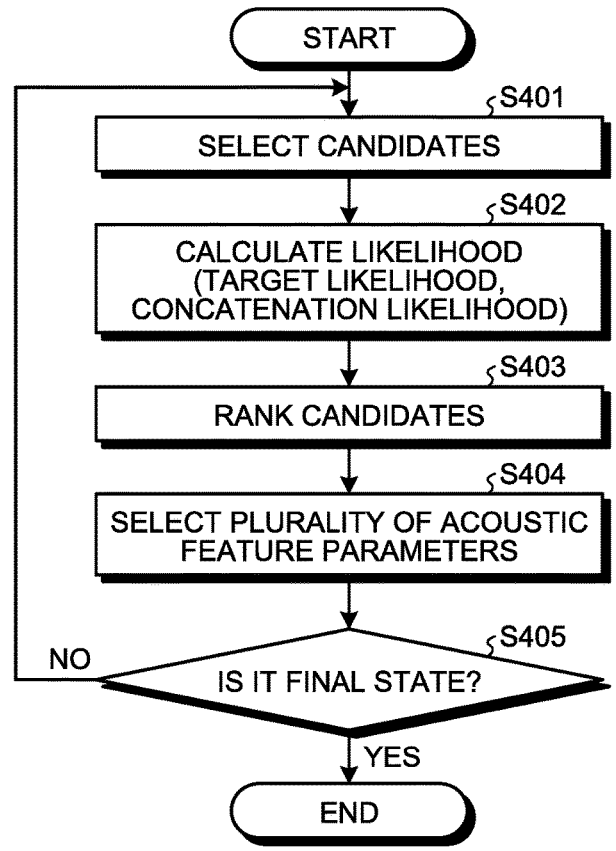
FIG. 10 is a flowchart illustrating a processing procedure of a multiple-acoustic feature parameter selection unit.

FIG. 10 is a flowchart illustrating one example of a processing procedure of the multiple-acoustic feature parameter selection unit 302. The multiple-acoustic feature parameter selection unit 302 first selects the candidates of acoustic feature parameters at Step S401, performs the calculation of the likelihood for each candidate of the acoustic feature parameters selected at Step S401 at Step S402, and performs, based on the likelihood calculated at Step S402, the ranking of the candidates of the acoustic feature parameters at Step S403. Then, the multiple-acoustic feature parameter selection unit 302 selects, at the next Step S404, a certain number of the acoustic feature parameters in descending order from the top of the ranking determined at Step S403. The processing of these Step S401 to Step S404 is performed in sequence from the initial state of the first HMM of the HMM sequence, and is repeated until the processing for the final state of the last HMM of the HMM sequence is completed (No at Step S405). Then, when the processing for the final state of the last HMM of the HMM sequence is completed (Yes at Step S405), the series of processing is terminated.

As for the candidates of the acoustic feature parameters selected at Step S401, the candidates that the optimal-acoustic feature parameter sequence generator 301 selected (candidates selected at Step S303 in FIG. 8) can be used. The likelihood calculation at Step S402 performs, for each of the candidates of the selected acoustic feature parameters, the calculation of the likelihood that includes both target likelihood and concatenation likelihood. For example, for each speech section, from the concatenation likelihood from the optimal acoustic feature parameters in the preceding speech section, the target likelihood in each speech section, and the concatenation likelihood to the optimal acoustic feature parameters in the subsequent speech section, the likelihood for the candidates of the acoustic feature parameters can be calculated.

Based on the likelihood thus calculated, the ranking of each of the candidates of the acoustic feature parameters is performed at Step S403, and a plurality of acoustic feature parameters are selected at Step S404. By the foregoing processing, for each state of each HMM of the input HMM sequence, a plurality of acoustic feature parameters can be selected, and a multiple-acoustic feature parameter sequence can be generated. The multiple-acoustic feature parameter selection unit 302 delivers the multiple-acoustic feature parameter sequence generated by the foregoing processing to the waveform generator 104.

Described has been an example using the method of maximum likelihood as a method for selecting the acoustic feature parameters. However, as a method for selecting the acoustic feature parameters based on the HMM sequence, any method can be used. For example, by defining a cost function that is calculated by the inverse of the likelihood, the square error with the mean vector, Mahalanobis distance, and others, the selection of the acoustic feature parameters may be performed by cost minimization. Furthermore, not by the selection of the acoustic feature parameters by the dynamic programming, the acoustic feature parameters may be selected only from the target likelihood by the distribution of the HMM sequence, or the selection of the acoustic feature parameters may be performed by calculating the cost from the acoustic likelihood and the prosodic likelihood. Moreover, by generating acoustic feature parameters from the HMM sequence, and performing cost calculation based on the distance from the generated acoustic feature parameters, the selection of the acoustic feature parameters may be performed.

As illustrated in FIG. 7 as the configuration of the multiple-acoustic feature parameter sequence generator 103, the configuration that the optimal-acoustic feature parameter sequence is generated by the optimal-acoustic feature parameter sequence generator 301 and that, based on the optimal-acoustic feature parameter sequence, a plurality of acoustic feature parameters for each speech section (each state of the HMM sequence) are subsequently selected by the multiple-acoustic feature parameter selection unit 302 has been illustrated. However, the configuration of the multiple-acoustic feature parameter sequence generator 103 is not limited to the above-described example. The multiple-acoustic feature parameter sequence generator 103 may be configured to select a plurality of acoustic feature parameters in sequence for each state from the beginning of the HMM sequence, for example. Furthermore, the multiple-acoustic feature parameter sequence generator 103 can use any desired method that selects a plurality of acoustic feature parameters from the candidates of the acoustic feature parameters and generates a multiple-acoustic feature parameter sequence, such as a method that selects a plurality of acoustic feature parameters of higher rank from the remaining candidates for which the optimal acoustic feature parameters included in the optimal-acoustic feature parameter sequence are excluded and generates a multiple-acoustic feature parameter sequence, for example.

The waveform generator 104 generates, based on the multiple-acoustic feature parameter sequence generated by the multiple-acoustic feature parameter sequence generator 103, the speech waveform corresponding to the input text.

Figure 11:
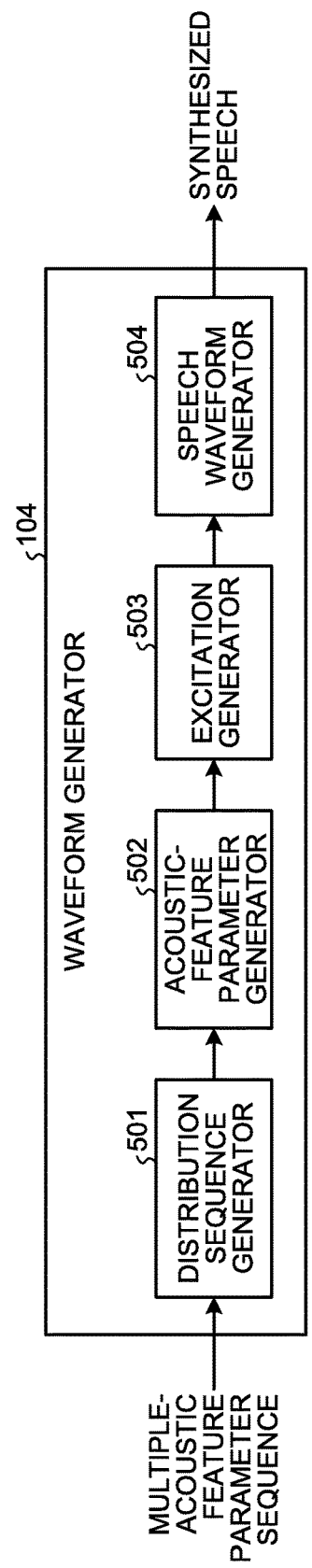
FIG. 11 is a block diagram illustrating an example of a configuration of a waveform generator.

FIG. 11 illustrates an example of the configuration of the waveform generator 104. The waveform generator 104 illustrated in FIG. 11 includes a distribution sequence generator 501, an acoustic-feature parameter generator 502, a excitation generator 503, and a speech waveform generator 504.

The distribution sequence generator 501 generates, based on a multiple-acoustic feature parameter sequence, a distribution of acoustic feature parameters from a plurality of acoustic feature parameters selected for each speech section, and obtains a distribution sequence for generating the acoustic feature parameters used for the generation of the actual speech waveform. The distribution of acoustic feature parameters uses the average value of a plurality of acoustic feature parameters as a mean vector, and the variance can also be calculated from the acoustic feature parameters. On the variance, it is also possible to use the variance of the distribution sequence of the HMM sequence, and in this case, the distribution can be generated even for the speech section of only one candidate of the acoustic feature parameter, for example.

Figure 12:
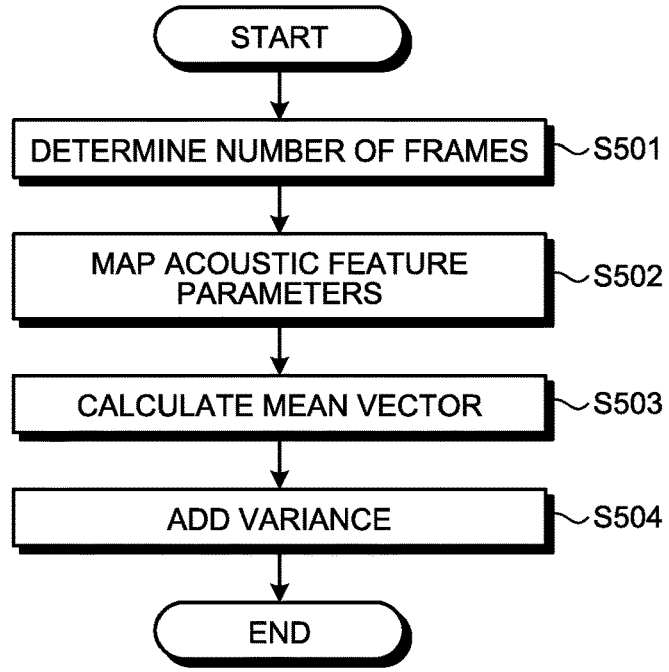
FIG. 12 is a flowchart illustrating a processing procedure of a distribution sequence generator.

FIG. 12 is a flowchart illustrating one example of a processing procedure of the distribution sequence generator 501. The distribution sequence generator 501 first determines, at Step S501, the number of frames in each state of the HMM sequence based on the duration distribution and performs, at Step S502, the associating (mapping) of a plurality of acoustic feature parameters included in the multiple-acoustic feature parameter sequence for each frame. Then, the distribution sequence generator 501 calculates, at the next Step S503, a mean vector from a plurality of acoustic feature parameters associated with each frame, and further at Step S504, generates the distribution sequence by adding, to the mean vector of each frame, the variance that is calculated from the acoustic feature parameters, for example. The distribution sequence may be generated by adding, to the mean vector of each frame, the variance of the distribution sequence of the HMM sequence as is.

The acoustic-feature parameter generator 502 generates the acoustic feature parameters from the distribution sequence generated by the distribution sequence generator 501. As for the acoustic feature parameters, the mean vector of the distribution sequence may be used as is as the acoustic feature parameter. However, it is desirable that the acoustic feature parameters be generated by performing a process of smoothing the mean vector so as to be a smooth sequence. The acoustic feature parameters generated by performing smoothing processing are referred to as smoothing acoustic feature parameters. In the smoothing processing, a low-pass filter may be applied to each dimension of the acoustic feature parameters, or various smoothing methods such as linear smoothing and spline smoothing can be applied. Furthermore, in the smoothing processing, a parameter generation algorithm that is used in HMM speech synthesis and in which the distribution of the dynamic feature parameters is taken into consideration may be used. In this case, the distribution of the HMM sequence is updated by substituting it with the distribution that is generated by the distribution sequence generator 501, and from the updated distribution sequence, the smoothing acoustic feature parameters are generated from the parameter generation algorithm based on the likelihood of static and dynamic feature parameters. Thus, the optimal smoothing acoustic feature parameters can be generated in which the distribution of the static and dynamic feature parameters of the multiple-acoustic feature parameter sequence is taken into consideration, and based on the smoothing acoustic feature parameters, a natural and smooth synthetic speech is obtained.

The excitation generator 503 generates a excitation waveform from the acoustic feature parameters (excitation parameters) used for excitation generation. The speech waveform generator 504 generates a speech waveform based on the excitation waveform generated by the excitation generator 503.

The excitation generator 503 can generate an excitation waveform from the pitch that is a prosodic feature parameter, or from the fundamental frequency parameters and the excitation parameters such as the band noise intensity, for example. In this case, the speech waveform generator 504 can generate the speech waveform, by performing filtering processing on the excitation waveform generated by the excitation generator 503 according to the acoustic feature parameters (spectrum envelope parameters) generated by the acoustic-feature parameter generator 502. While the speech waveform generator 504 is generating the speech waveform, the duration can be generated by determining the number of frames for each state in the distribution sequence generator 501 as in the foregoing, and by associating each frame with the frames of the acoustic feature parameter sequence in accordance with the obtained number of frames. Furthermore, generating a pitch sequence from the pitch and fundamental frequency parameters, generating pitch marks from the generated pitch sequence, and overlap-adding the excitation waveform in accordance with the obtained pitch marks cause the excitation generation to be performed. Similarly, holding the excitation parameters as the parameters based on the phase or group delay, generating the amplitude spectrum from the spectrum envelope parameters, generating the phase spectrum from the excitation parameters, and overlap-adding the waveforms obtained by inverse Fourier transformation in accordance with the pitch marks cause a speech waveform for which the excitation parameters by the phase information are reflected to be generated. By the foregoing processing, the waveform of the synthesized speech is generated.

Figure 13:
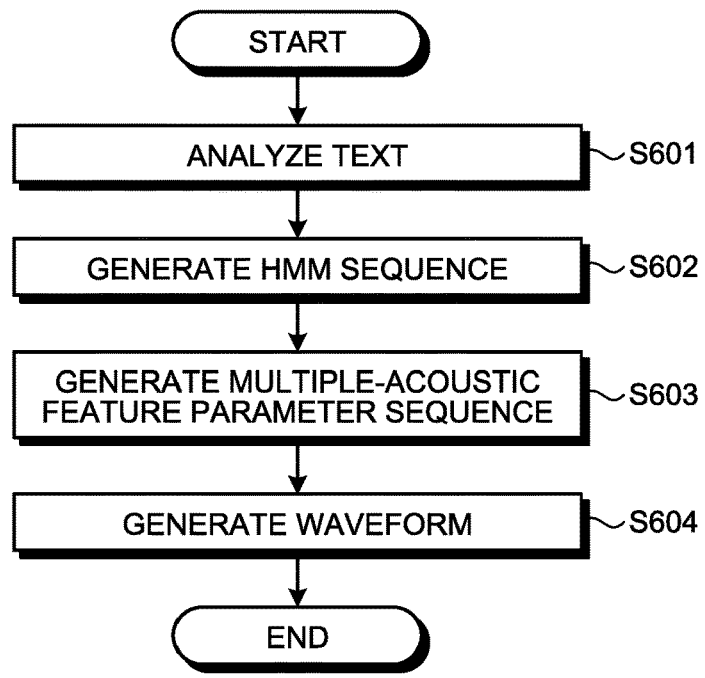
FIG. 13 is a flowchart illustrating the outline of a series of processes performed by the speech synthesizer.

FIG. 13 is a flowchart illustrating the outline of a series of processes performed by the speech synthesizer in the first embodiment. The speech synthesizer in the first embodiment, at Step S601, first generates, by analyzing input text, context information corresponding to the input text, and at Step S602, generates an HMM sequence corresponding to the context information generated at Step S601 while referring to the HMM storage unit 105. Then, the speech synthesizer in the first embodiment, at Step S603, generates a multiple-acoustic feature parameter sequence by performing the processing illustrated in FIG. 8, and at Step S604, performs the waveform generation by generating a distribution sequence from the multiple-acoustic feature parameter sequence generated at Step S603, and generating acoustic feature parameters from the generated distribution sequence.

The following describes the processing of the various units in the foregoing in detail while referring to a specific example. In the following description, it is assumed that, as feature parameters, a mel-LSP is used for the spectrum information, a band aperiodic ratio (BAP) is used for the excitation information, and a logarithmic fundamental frequency (LF0) is used for the pitch information, and a speech is expressed by Δ parameters and $\Delta^2$ parameters that are the respective dynamic feature parameters of the foregoing. It is also assumed that the duration is generated as label boundary information.

Figure 14:
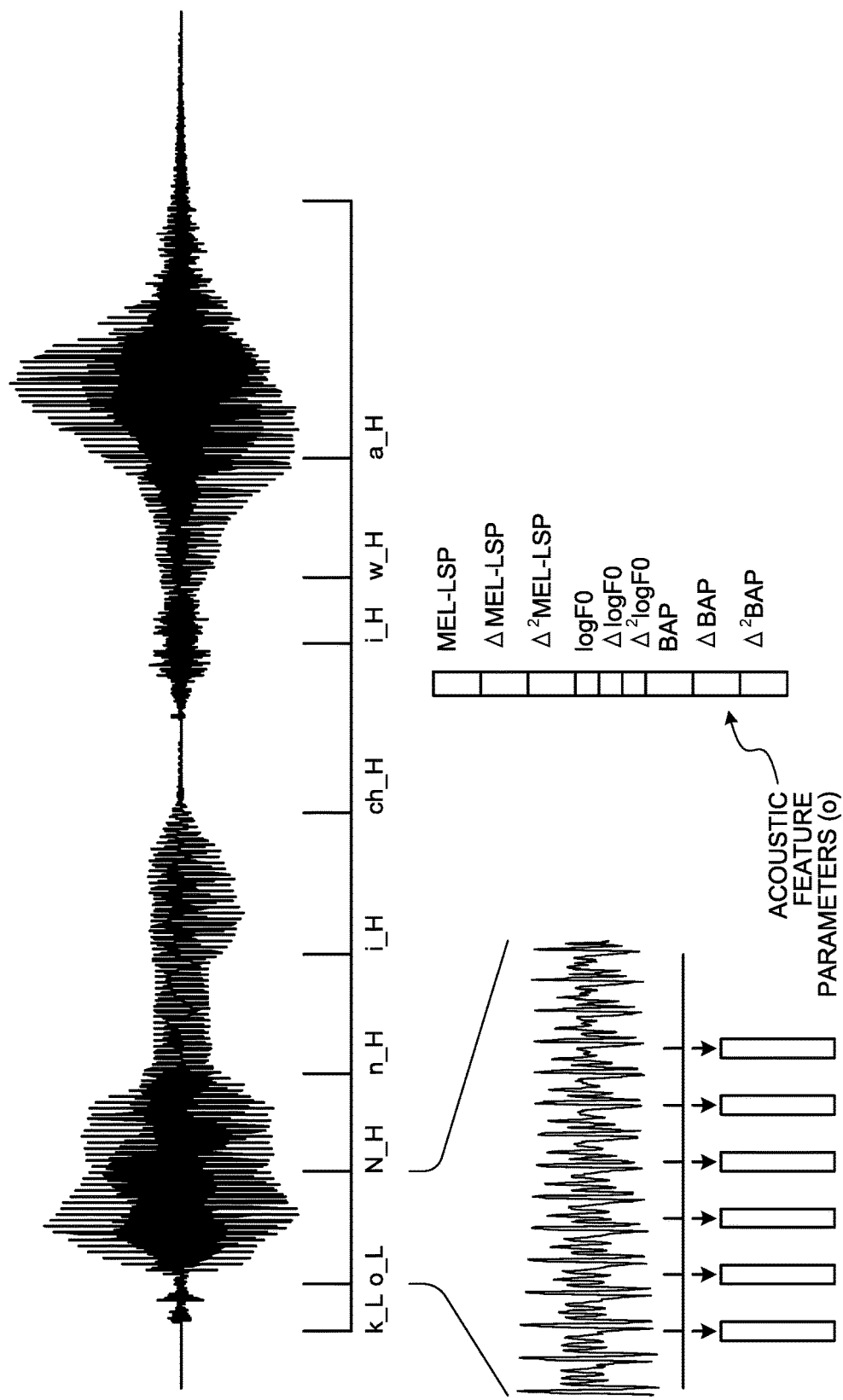
FIG. 14 is a diagram illustrating one example of a speech waveform, acoustic feature parameters, and context information.

FIG. 14 is a diagram illustrating one example of a speech waveform, acoustic feature parameters thereof, and the context information. In the example illustrated in FIG. 14, for the utterance of "ko-n-ni-chi-wa", a phoneme sequence, the boundary information thereof, and the pitch information on mora are presented. The pitch of mora, in an accent phrase, is indicated as "H" in the case of a high pitch, and indicated as "L" in the case of a low pitch. The foregoing information is one example of context information.

In FIG. 14, illustrated in addition are an enlarged waveform of a section of the phoneme "o_L", and the acoustic feature parameters of each frame obtained by a fixed frame rate from this waveform. The acoustic feature parameters indicate the mel-LSP, the LF0 (log F0), and the BAP, with the respective Δ parameters and the $\Delta^2$ parameters thereof in juxtaposition for each frame. The acoustic feature parameters can be calculated by interpolating the parameters obtained by pitch synchronous analysis at a fixed frame rate, or calculated by fixed frame rate analysis, STRAIGHT analysis, and the like. The mel-LSP and its dynamic features, the LF0 and its dynamic features, and the BAP and its dynamic features are referred to as a stream of the respective acoustic feature parameters. From the speech waveform of the speech corpus 201 (speech database), the information on the HMM that is trained based on the foregoing information is stored in the HMM storage unit 105. The HMM storage unit 105 stores therein the information as the decision trees of states of the HMMs and as the output distributions of the leaf nodes thereof. Furthermore, each acoustic feature parameter, the context information thereof, state boundaries, and the information that is associated with the leaf nodes of the decision tree stored in the HMM storage unit 105 are stored in the acoustic-feature parameter storage unit 106.

Figure 15:
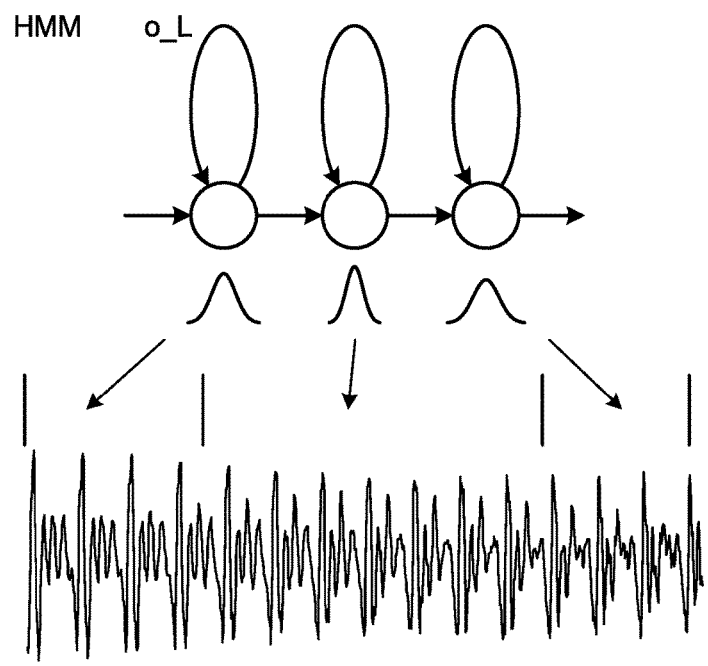
FIG. 15 is a diagram illustrating an example of time boundaries by Viterbi alignment.

FIG. 15 is a conceptual diagram for dividing the enlarged waveform illustrated in FIG. 14 into the speech section for each state of the HMM. When the number of states of the HMM for each phoneme is defined as three, by the Viterbi alignment as illustrated in FIG. 15, a time boundary is obtained so as to correspond to each state of the HMM, and the boundary information thereof is stored. Thus, the acoustic feature parameters corresponding to the waveform of the speech section associated with each state can be identified, and can be used as the candidates of the acoustic feature parameters that the multiple-acoustic feature parameter sequence generator 103 selects.

Figure 16:
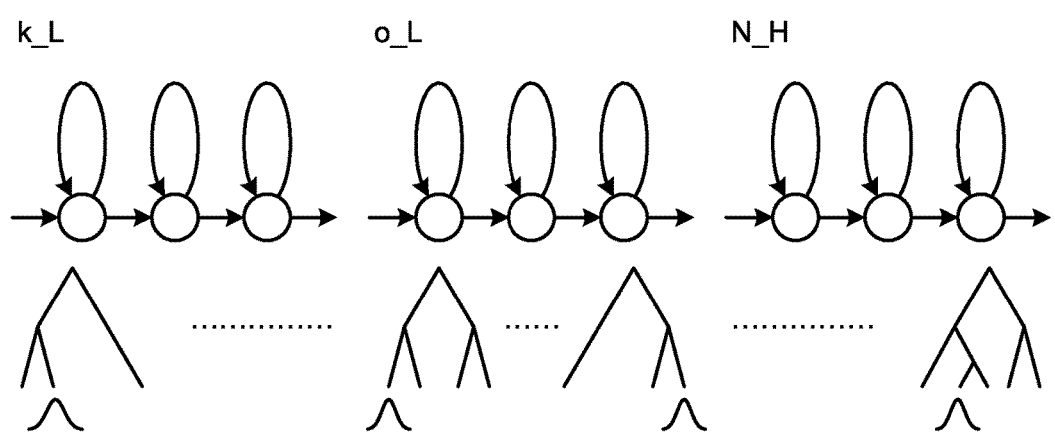
FIG. 16 is a diagram for explaining the processing of an HMM sequence generator.

As an example, when the speech of a portion of "Ko-n" out of "Ko-n-ni-chi-wa" is synthesized, the HMM sequence generator 102 generates an HMM sequence that corresponds to the context information "k_L", "o_L", and "N_H". In this case, as illustrated in FIG. 16, the HMM corresponding to each phoneme is concatenated and the HMM sequence is generated. Each state of each HMM constituting the HMM sequence is associated with the output distribution of the leaf node that is obtained by traversing the decision tree. In practice, the decision tree is generated for each stream, and thus the distribution of each stream is selected by traversing the decision tree for each state and for each stream. The decision tree clustering is similarly performed on also the state-duration distribution that is a self-transition probability, and the distribution of the leaf node is selected as the duration distribution. In the case of three states, the number of decision trees is a total of 10 with the decision trees of each state of the mel-LSP, the LF0, and the BAP and with the decision tree of the duration distribution, and the distribution is selected from the decision trees of the respective states and the respective streams.

Figure 17:
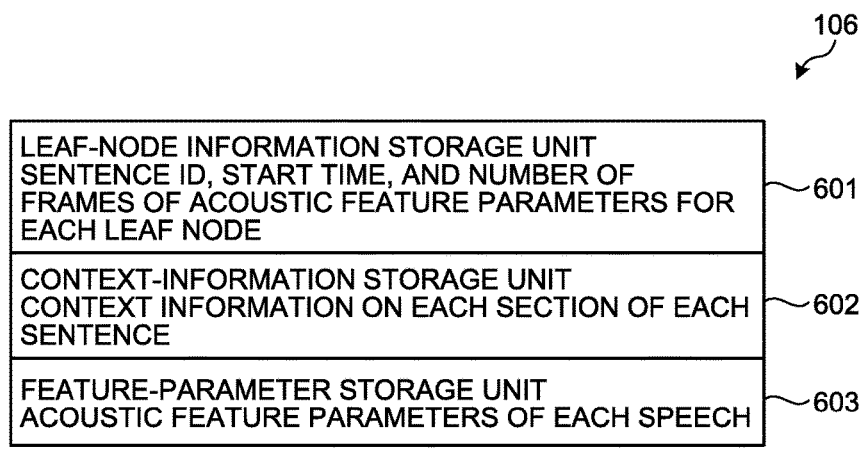
FIG. 17 is a diagram illustrating an example of a configuration of a feature-parameter storage unit.

The acoustic-feature parameter storage unit 106, as illustrated in FIG. 17, includes a leaf-node information storage unit 601, a context-information storage unit 602, and a feature-parameter storage unit 603, for example. The leaf-node information storage unit 601 stores therein the information required for searching for the acoustic feature parameters such as a sentence ID, start time, and the number of frames of the acoustic feature parameters used as the training data of the distribution of each leaf node of the decision tree. Because the decision tree is held for each state, as illustrated in FIG. 15, the start time of each state and the number of frames, which are associated with by the Viterbi alignment, are stored together with the sentence ID.

The context-information storage unit 602 stores therein the context information corresponding to each speech data to be used as the attribute in the selection of the acoustic feature parameters. The feature-parameter storage unit 603 stores therein the acoustic feature parameters illustrated in FIG. 14. Accordingly, after the HMM sequence is generated, the training data of the leaf nodes in each state can be used as the candidates of the acoustic feature parameters, and the candidates of the acoustic feature parameters are determined by referring to the leaf-node information storage unit 601 from an ID of the leaf node. The multiple-acoustic feature parameter sequence generator 103 selects, out of the candidates of the acoustic feature parameters thus determined, a plurality of acoustic feature parameters for each speech section, when generating a multiple-acoustic feature parameter sequence.

In the multiple-acoustic feature parameter sequence generator 103, when generating a multiple-acoustic feature parameter sequence by the optimal-acoustic feature parameter sequence generator 301 and the multiple-acoustic feature parameter selection unit 302 as in the configuration example illustrated in FIG. 7, the optimal-acoustic feature parameter sequence generator 301 first generates the optimal-acoustic feature parameter sequence by the likelihood function. When the model is defined as λ, the stream is defined as s, the sentence number is defined as r, and the acoustic feature parameter sequence is defined as $O_{sr}$, the optimal-acoustic feature parameter sequence is expressed as the following Expression (1), and the likelihood function $P(O_{sr}|\lambda)$ is calculated as in the following Expression (2).

$$\hat{O}_{sr} = \underset{O_{sr}}{\mathrm{argmax}} P(O_{sr} \mid \lambda) \qquad (1)$$

$$P(O_{sr} \mid \lambda) = \prod_{all\ j,q} P(o_{sjqr} \mid s, j, q, \lambda) P(o_{sjqr} \mid o_{s(pre(jq))r}, \lambda) \qquad (2)$$

Wherein, the q is an HMM number, and the j is a state number. The pre(jq) represents a state immediately before and, when the number of states of each HMM is defined as J, is expressed by the following Expression (3). In the case of the initial state of HMM q, the pre(jq) is the final state J−1 of HMM q−1, and is the preceding state j−1 of HMM q otherwise.

$$pre(jq) = \begin{cases} (j-1)q & \text{if } j > 0 \\ (J-1)(q-1) & \text{if } j = 0 \end{cases} \qquad (3)$$

The first term of the likelihood function represents the likelihood for each state of the HMM, and represents the likelihood (state likelihood) that $O_{sjqr}$ is observed with respect to the model $\lambda$, HMM q, state j, and stream s. The second term of the likelihood function represents the likelihood for concatenation, and represents the likelihood (concatenation likelihood) that $O_{sjqr}$ is observed when the acoustic feature parameter (feature vector) $O_{s(pre(jq))r}$ with respect to the model X and the preceding state is given. The state likelihood is further calculated from the likelihood of each stream of the duration likelihood, spectrum (spec), excitation (exc), and fundamental frequency ($lf_0$) by the following Expression (4).

$$P(o_{jqr} \mid j, q, \lambda) = \quad (4)$$
$$p(dur(o_{jqr}) \mid \mu_{\{dur\}jq}, \Sigma_{\{dur\}jq})^{\gamma_{\{dur\}}} \cdot \prod_{s \in \{spec, exc, lf_0\}} p(o_{sjqr} \mid \mu_{sjq}, \Sigma_{sjq})^{\gamma_s}$$

Wherein, the $\mu_{sjq}$, $\Sigma_{sjq}$, and $\gamma_s$ each represent the mean vector of the HMM q, state j, and stream s, the covariance matrix thereof, and the stream weight thereof, the $dur(o_{jqr})$ represents the duration of $o_{jqr}$, and the $\mu_{\{dur\}jq}$, $\Sigma_{\{dur\}jq}$, and $\gamma_{\{dur\}}$ each represent the mean vector of the HMM q and the duration distribution of state j, the covariance matrix thereof, and the weight thereof.

In the first embodiment, the spec is a stream of the mel-LSP, the exc is a stream of the BAP, and the $lf_0$ is a stream of the logarithmic fundamental frequency LF0. The stream likelihood p can further use the following Expression (5) and the likelihood in which the likelihood of the Gaussian distribution $N(o|\mu,\Sigma)$ of the acoustic feature parameter (feature vector) $o_{stjqr}$ of each frame is normalized with the number of frames. For the reduction in the amount of calculation, the likelihood of feature quantity that has been averaged in advance may be used.

$$p(o_{sjqr} \mid \mu_{sjq}, \Sigma_{sjq}) = {}^{T_{jqr}}\sqrt{\prod_{t=0}^{T_{jqr}-1} N_{sjq}(o_{stjqr} \mid \mu_{sjq}, \Sigma_{sjq})} \quad (5)$$

The stream weighting $\gamma$ may be fixed to one, can also use the inverse of degree, and may further be set in accordance with the importance of each stream.

The concatenation likelihood is further calculated by the following Expression (6).

$$P(o_{jqr} \mid o_{pre(jq)r}, \lambda) = p(dur(o_{jqr}) \mid dur(o_{post(pre(jq))r}), \Sigma_{\{dur\}jq})^{\gamma_{\{dur\}}} \cdot \quad (6)$$
$$\prod_{s \in \{spec, exc, lf_0\}} p(o_{sjqr} \mid \langle o \rangle_{s(post(pre(jq)))r}, \Sigma_{sjq})^{\gamma_s}$$

The post(jq) in Expression (6) represents a subsequent state of the HMM q and state j, and is expressed by the following Expression (7). Furthermore, in the case of the final state of HMM q, the post(jq) is the initial state of the subsequent HMM q+1, and is the subsequent state j+1 of the HMM q otherwise.

$$post(jq) = \begin{cases} (j+1)q & \text{if } j > J-1 \\ 0(q+1) & \text{if } j = J-1 \end{cases} \quad (7)$$

In addition, the $\langle O \rangle_{s(post(pre(jq)))r}$ in the Expression (6) represents the average value of the acoustic feature parameters of the speech section that corresponds to the state subsequent to the acoustic feature parameters $o_{s(pre(jq))r}$ of the preceding state pre(jq), and is the distribution in which the mean vector is replaced. This is because it becomes the average value of maximum-likelihood estimation by the subsequent section of the acoustic feature parameters of the preceding state, and thus this distribution can be used in the calculation of the concatenation likelihood. Similarly, on the duration also, the concatenation likelihood can be calculated where the duration $dur(o_{post\ (pre\ (jq))r})$ of the subsequent sections of the acoustic feature parameters of the preceding state is the average value.

As in the foregoing, the optimal-acoustic feature parameter sequence that maximizes the likelihood function defined by Expression (2) is obtained by dynamic programming. As indicated in the following Expression (8), the $\phi(n,j,q)$ is defined as the maximum likelihood in the case of selecting the $o_{s(pre(jq))r}$ from the speech section $o_{s00r}$ and further selecting the candidate n in the HMM q and in the state j.

$$\phi(n, j, q) = \quad (8)$$
$$\max_m \{\phi(m, pre(j, p)) P(o_{nsjqr} \mid o_{ms(pre(jq))r}, \lambda)\} \cdot P(o_{nsjqr} \mid s, j, q, \lambda)$$

Furthermore, the $\psi(n,j,q)$ is an index of the candidate of the acoustic feature parameter (optimal acoustic feature parameter) that gives the maximum logarithmic likelihood in the preceding state with respect to the HMM q, state j, and candidate n, and is defined as the following Expression (9).

$$\psi(n, j, q) = \operatorname*{argmax}_m \{\phi(m, pre(j, p)) P(o_{nsjqr} \mid o_{ms(pre(jq))r}, \lambda)\} \quad (9)$$

By using these, the optimal-acoustic feature parameter sequence is obtained. At the time of likelihood calculation, based on the logarithmic likelihood in practice, the power can be calculated by the weight calculation, and Expression (5) can be calculated by the average value of the logarithmic likelihood. Furthermore, Expression (8) can be calculated as the following Expression (10).

$$\log\phi(n, j, q) = \quad (10)$$
$$\max_m \{\log\phi(m, pre(j, p)) + \log P(o_{nsjqr} \mid o_{ms(pre(jq))r}, \lambda)\} +$$
$$\log P(o_{nsjqr} \mid s, j, q, \lambda)$$

The optimal-acoustic feature parameter sequence generator 301 obtains, on the initial state of the first HMM of the HMM sequence, the candidates of the optimal acoustic feature parameters by performing the calculation of the following Expression (11).

$$\phi(n, j_0, q_0) = P(o_{nsj_0q_0r} \mid s, j_0, q_0, \lambda) \quad (11)$$

Then, after obtaining the candidates of the optimal acoustic feature parameters by Expression (8) and Expression (9) up to the final state of the last HMM in the HMM sequence, the maximum likelihood in the final state and the optimal acoustic feature parameter that gives the maximum likelihood are obtained by the following Expression (12).

$$\hat{P}(O_{sr} | \lambda) = \max_m \{\phi(m, J-1, Q-1)\}, \quad (12)$$

$$\hat{\psi}(J, Q) = \underset{m}{\mathrm{argmax}}\{\phi(m, J-1, Q-1)\}$$

Then, by following the ψ in sequence by backtracking, the optimal-acoustic feature parameter sequence expressed by the following Expression (13) can be determined.

$$\hat{\psi}(j,q) = \hat{\psi}(\hat{\psi}(\mathrm{post}(j,q))\mathrm{post}(j,q)) \quad (13)$$

Figure 18:
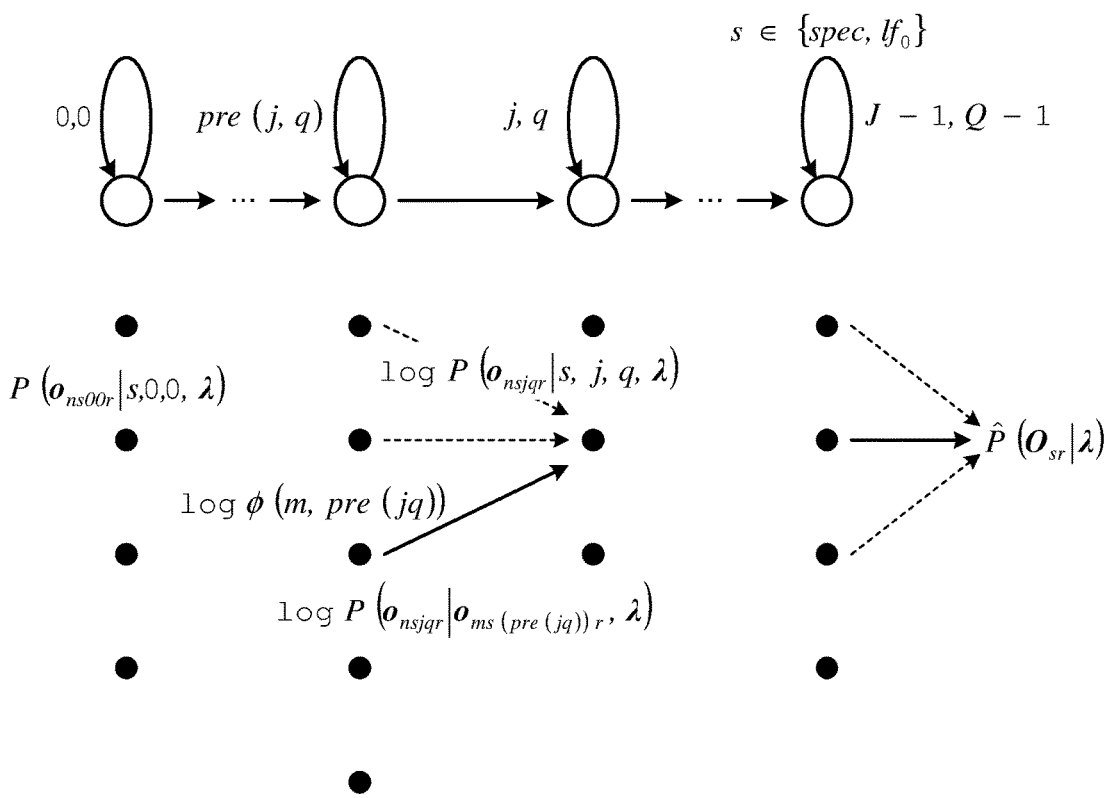
FIG. 18 is a diagram for explaining the processing of the optimal-acoustic feature parameter sequence generator.

FIG. 18 illustrates the outline of the foregoing processing. The upper section in FIG. 18 represents the HMMs, and the black dots represent the candidates of the optimal acoustic feature parameters for each state. With respect to the acoustic feature parameters of the candidate n in the HMM q and state j, selecting the m that maximizes the sum of the cumulative logarithmic likelihood log φ(m,pre(jq)) of the preceding state pre(jq) and the concatenation logarithmic likelihood log P ($o_{nsjqr}|o_{ms(pre(jq))r}$,λ) storing it in ψ(j,q), and further adding the state likelihood log P($o_{nsjqr}$|s,j,q,λ) cause the log φ(m,j,q) to be obtained. Repeating the foregoing processing from the initial state of the first HMM of the HMM sequence up to the final state of the last HMM and performing backtracking from the ψ(J−1,Q−1) last cause the optimal-acoustic feature parameter sequence to be obtained.

While the selection of acoustic feature parameters based on the likelihood maximization is performed in the above-described method, other methods such as using the selection based on the longest matching in combination, or performing the selection in which the matching degree of context information is taken into consideration may be used. In the case of the longest matching selection, it can be implemented by selecting the candidates of fewer number of concatenation sections while selecting the acoustic feature parameters in a preferential manner when the acoustic feature parameters of the speech section adjacent to a preceding section are included, for example. That is, for the candidates of the acoustic feature parameters selected for each speech section, an adjacent index that indicates whether the candidate is adjacent to the acoustic feature parameters of the preceding speech section in the speech waveform included in the speech corpus 201 is calculated, and based on the calculated adjacent index, the acoustic feature parameters that are adjacent to the acoustic feature parameters of the preceding speech section in the speech waveform included in the speech corpus 201 are selected preferentially. Furthermore, at a stage of preliminary selection, it becomes possible to select the acoustic feature parameters in which the context information is reflected by such as a method for excluding the acoustic feature parameters not matching the context information from the candidates. While the foregoing selection method is the selection in units of a state, it may be selected in different units such as the selection in units of HMM that is a unit of phoneme.

The selection of acoustic feature parameters may be performed on the respective parameters of different types, such as the selection of duration, the selection of a pitch stream, and the selection of a spectrum stream. In fact, because the decision tree of the HMM is structured for each stream, the feature quantity of the leaf node is not necessarily in common, and thus, in order to make the selection in the above-described manner, there is a need to select each of the duration, pitch stream, spectrum stream, and the like. In this case, the respective optimal acoustic feature parameters are selected, by first performing the selection of the duration, and in selecting the pitch parameter, by selecting the selected duration by being replaced with the average value of the distribution, and in selecting the spectrum parameter, based on the selected duration and the pitch parameter by being replaced with the mean vector of the distribution. By this, the optimal-acoustic feature parameter sequence can be obtained.

The multiple-acoustic feature parameter selection unit 302 generates the multiple-acoustic feature parameter sequence by selecting a plurality of acoustic feature parameters for each state. The likelihood in each state of each model for selecting a plurality of acoustic feature parameters is calculated by the following Expression (14).

$$P(O_{jqr}|\lambda) = P(o_{jqr}|\delta_{pre(jq)r},\lambda)P(O_{jqr}|j,q,\lambda)P(o_{jqr}|\delta_{post(jq)r},\lambda) \quad (14)$$

Figure 19:
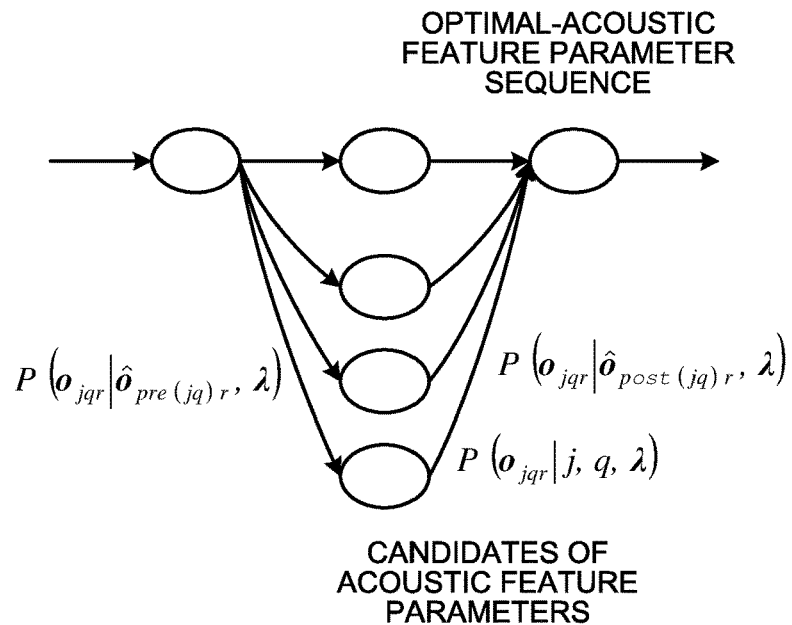
FIG. 19 is a diagram for explaining the processing of the multiple-acoustic feature parameter selection unit.

The right-hand side of Expression (14) is the product of three pieces of likelihood. The first term represents the likelihood when the optimal acoustic feature parameters of the preceding section are connected to the acoustic feature parameters of the relevant speech section, the second term represents the likelihood of the acoustic feature parameters of the relevant speech section, and the third term represents the likelihood when the acoustic feature parameters from the relevant speech section are connected to the optimal acoustic feature parameters of the subsequent section. The first term can be obtained based on the mean vector of the subsequent section of the optimal acoustic feature parameters of the preceding section and based on the covariance matrix of the HMM sequence. The second term is calculated by the output distribution of the relevant speech section of the HMM sequence. The third term is calculated by the mean vector of the subsequent section of the acoustic feature parameters of the relevant speech section and by the covariance matrix of the HMM sequence of the subsequent section. This processing, as illustrated in FIG. 19, is the processing that calculates Expression (14) for each of the acoustic feature parameters in each state, and that selects the higher-ranked N acoustic feature parameters.

Figure 20:
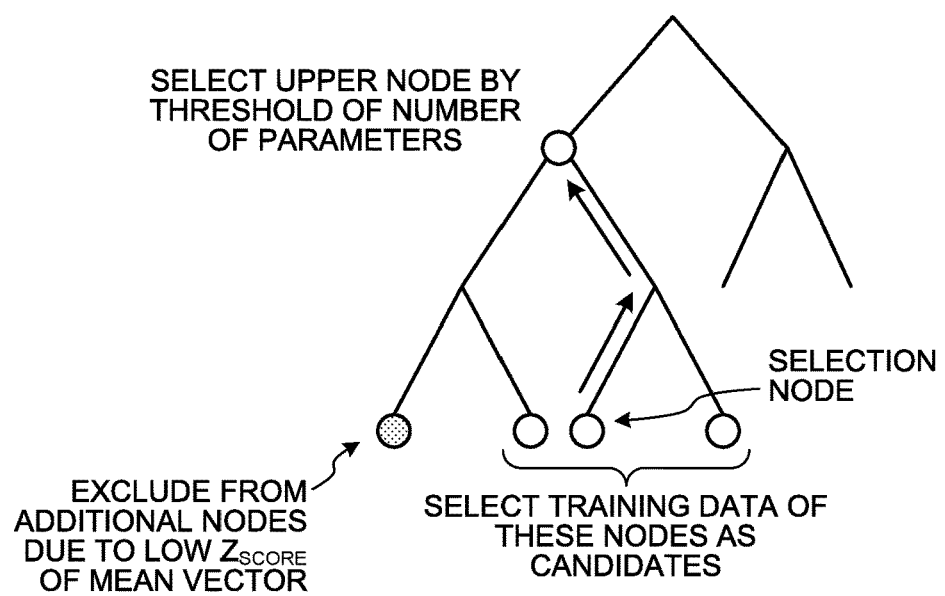
FIG. 20 is a diagram for explaining the processing of adding candidates of acoustic feature parameters.

In the above-described method, the candidates of the acoustic feature parameters used for the selection of the acoustic feature parameters use the training data of the distribution of the leaf nodes. However, more acoustic feature parameters may be used as the candidates. For example, the upper node is searched for so that the number of candidates is above a certain number, and the training data of the distribution included in the leaf nodes below the upper node can be used as the candidates. In this case, as illustrated in FIG. 20, when the number of acoustic feature parameters used to train the selected node according to the context information is smaller than a predetermined threshold value, an upper node is searched for, and a node for which the number of acoustic feature parameters included in the leaf nodes below the node is larger than the threshold value is obtained. All of the training data of the nodes included below the obtained node may be selected as candidates. However, based on the mean vector and standard deviation of the selected nodes, the distant distribution may be excluded. In this case, it can be determined based on the distance between distributions, and it can be determined by threshold processing of Zscore expressed by $Z=(\mu_{add}-\mu_{sel})/\sigma_{sel}$, for example.

The waveform generator 104 generates a distribution sequence based on the generated multiple-acoustic feature parameter sequence, and based on the obtained distribution sequence, generates a speech waveform. The distribution sequence generator 501 generates a distribution sequence by the processing illustrated in FIG. 12, for example. In this case, at Step S503 in FIG. 12, a mean vector is calculated by the following Expression (15).

$$\mu_{tjqr} = \frac{1}{N} \sum_n o^n_{map(t)jqr} \quad (15)$$

Wherein, the t indicates the frame number in the sentence r, HMM q, and state j, and the map(t) is a mapping function for determining the frame in the selected n-th acoustic feature parameter $o_n$ and calculates the average of N acoustic feature parameters. The variance can also be similarly calculated from N acoustic feature parameters, and the variance of the HMM q and state j of the HMM output distribution may also be used.

The acoustic-feature parameter generator 502 generates, based on the distribution sequence generated by the distribution sequence generator 501, the acoustic feature parameters used in the actual speech synthesis. When the acoustic feature parameter generation based on the distribution of the static and dynamic feature parameters is performed and when the Δ parameters and the $\Delta^2$ parameters are used as the dynamic feature parameters, the acoustic feature parameters that the acoustic-feature parameter generator 502 outputs are obtained by the following method.

By using the static feature parameter $c_t$ and using the dynamic feature parameters $\Delta c_t$ and $\Delta^2 c_t$ that are determined from the acoustic feature parameters of the previous and subsequent frames, the acoustic feature parameter of at the time t is expressed as $ot=(c_t',\Delta c_t',\Delta^2 c_t')$. When the state sequence is defined from the duration distribution, the vector $C=(c_0', \ldots, c_{T-1}')'$ composed of static feature parameters $c_t$ that maximize the $P(O|J,\lambda)$ is obtained by solving the following Expression (16) with the $0_{TM}$ as the zero vector of T×Mth order.

$$\frac{\partial}{\partial C} \log P(O \mid J, \lambda, T) = 0_{TM} \quad (16)$$

Wherein, the T is the number of frames, and the J is a state transition sequence.

When the relation between the acoustic feature parameters O and the static feature parameters C is correlated by a matrix W that calculates the dynamic feature parameters, it is expressed as O=WC. The O is a vector of 3TM, the C is a vector of TM, and the W is a matrix of 3TM×TM. When $\mu=(\mu_{s00}', \ldots, \mu_{sJ-1Q-1}')'$ and $\Sigma=\text{diag}(\Sigma_{s00}', \ldots, \Sigma_{sJ-1Q-1}')'$ are defined as the mean vector and covariance matrix of the distribution that corresponds to the sentence in which the mean vector and diagonal covariance of the output distribution at each time are all lined, Expression (16) can obtain the sequence C of the optimal acoustic feature parameters by solving the following Expression (17).

$$W'\Sigma^{-1}WC = W'\Sigma^{-1}\mu \quad (17)$$

This equation is obtained by the method in accordance with Cholesky decomposition, and in the same manner as the solution used in the time updating algorithm of RLS filter, can generate a parameter sequence in order of time albeit having a delay time and can obtain it at high speed.

In the speech synthesis method based on HMM, the mean vector μ and covariance matrix Σ are generated by defining the number of frames of each state from the statistical quantity such as an average value of the duration distribution in each state of the HMM, and by constructing the mean vector and covariance matrix in each state being juxtaposed in accordance with the number of frames thereof for a certain section such as the whole of a sentence or the number of frames corresponding to a predetermined delay time. The acoustic-feature parameter generator 502 in the first embodiment applies this algorithm to the multiple-acoustic feature parameter sequence. In this case, based on the mean vector μ and covariance matrix Σ generated in the distribution sequence generator 501, and solving the above-described Expression (17), the acoustic feature parameter sequence can be generated.

Thus, in the first embodiment, as compared with the case of using the output distribution of the HMMs, because they are not averaged in the time direction, the acoustic feature parameters used for speech synthesis can be generated from the distribution sequence for which the temporal resolution is increased. Furthermore, because the acoustic feature parameters of μ are generated from not the acoustic feature parameters averaged from a large amount of training data but the acoustic feature parameters of a limited number, the influence of over-smoothing is suppressed, and the acoustic feature parameters of realistic voice feeling can be generated. Also, as compared with the case of selecting a single acoustic feature parameter, the acoustic feature parameters for which the mismatch of context information and the feeling of discontinuity in concatenation boundaries are reduced can be generated.

Moreover, in the first embodiment, by applying the above-described Expression (17) for the generation of the acoustic feature parameters used for speech synthesis, the generation of the acoustic feature parameters in which the distribution of the dynamic feature parameters is taken into consideration is made possible. In other words, the generation of the acoustic feature parameters that express an appropriate smoothness in accordance with the distribution of dynamic feature parameters is made possible. Thus, the generation of acoustic feature parameters can be performed more appropriately than the case in which the parameters in which the static feature parameters of the selected acoustic feature parameters are just concatenated, and the case in which the foregoing parameters are linearly interpolated. Accordingly, in the first embodiment, the selection and smoothing of the selected acoustic feature parameters can be performed for each type of acoustic feature parameter, and a more natural and smooth speech than that of the speech synthesis by the concatenation of speech waveforms can be synthesized.

Figure 21:
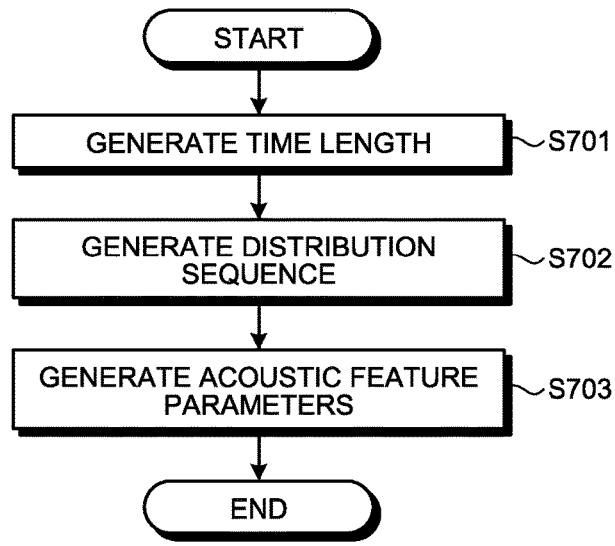
FIG. 21 is a flowchart illustrating a processing procedure up to generation of the acoustic feature parameters.

FIG. 21 is a flowchart illustrating a processing procedure of the foregoing processing performed by the waveform generator 104. The distribution sequence generator 501, at Step S701, first generates the time length (the number of frames) in each state and, at Step S702, generates a distribution sequence based on a multiple-acoustic feature parameter sequence. Then, the acoustic-feature parameter generator 502, at Step S703, based on the above-described Expression (17), generates a sequence of acoustic feature parameters used for speech synthesis from the distribution sequence generated at Step S702.

Figure 22:
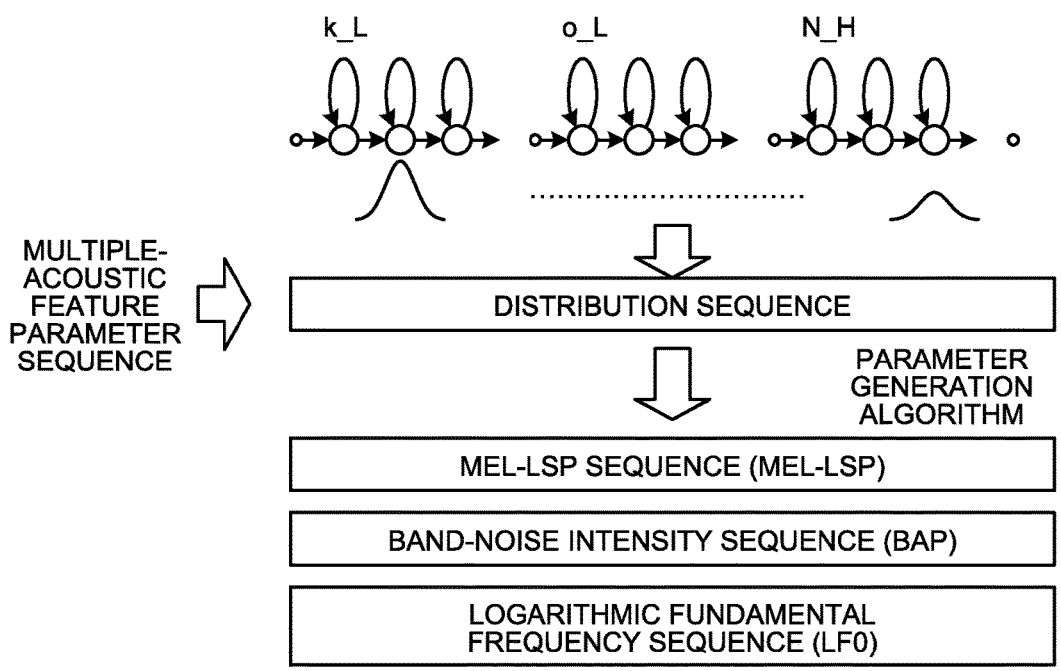
FIG. 22 is a diagram for explaining the processing up to the generation of the acoustic feature parameters.

FIG. 22 is a diagram for explaining the foregoing processing performed by the waveform generator 104. The distribution sequence generator 501 generates a distribution sequence from HMMs and the duration distribution thereof, and replaces the mean vector with the multiple-acoustic feature parameter sequence. Then, the acoustic-feature parameter generator 502 generates, from this replaced distribution sequence, the acoustic feature parameters of the mel-LSP sequence (mel-LSP), the band-noise intensity sequence (BAP), and the logarithmic fundamental frequency sequence (LF0), and uses them for waveform generation.

Figure 23:
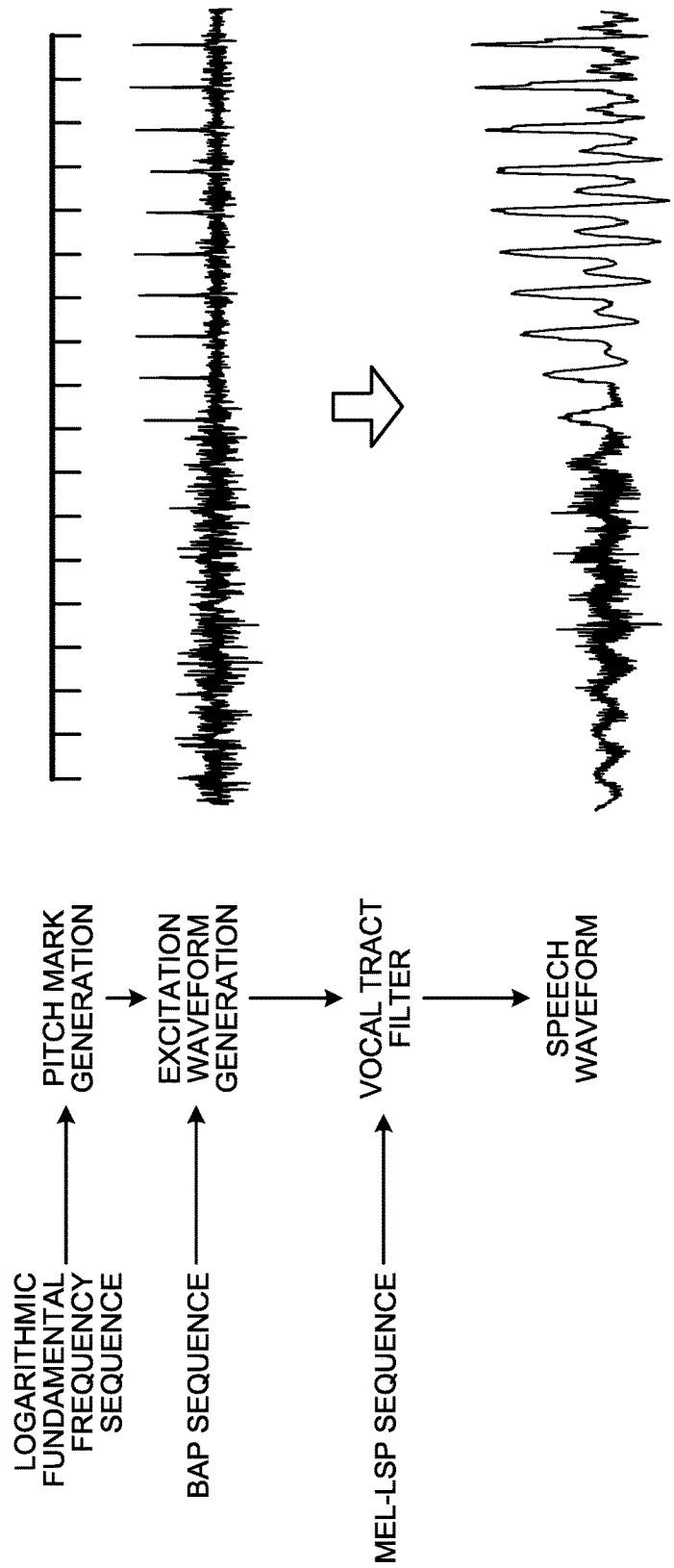
FIG. 23 is a diagram for explaining the processing of the waveform generator.

The excitation generator 503 generates a excitation waveform from the logarithmic fundamental frequency sequence and the band-noise intensity sequence. The excitation generator 503, as illustrated in FIG. 23, generates pitch marks from the logarithmic fundamental frequency sequence, and in accordance with the band noise intensity (BAP) sequence, generates the excitation waveform by controlling the ratio of the noise component and the pulse component. The speech waveform generator 504 then generates a speech waveform by applying, to the excitation waveform generated by the excitation generator 503, a vocal tract filter according to the mel-LSP sequence. At this time, by applying a post-filter for the formant emphasis to the generated mel-LSP sequence, the clarity can be improved. Furthermore, by generating a phase spectrum from a group delay and phase parameters, generating an amplitude spectrum from the spectrum parameters, and generating a pitch waveform corresponding to each pitch mark by the inverse FFT, the waveform generation may be performed by superposition processing. By the foregoing processing, the speech waveform is generated.

As explained in detail with a specific example in the foregoing, in the speech synthesizer of the first embodiment, an HMM sequence is generated based on the context information on the input text and, based on the generated HMM sequence, a multiple-acoustic feature parameter sequence is generated by selecting a plurality of acoustic feature parameters for each speech section. Then, a distribution sequence is generated from the multiple-acoustic feature parameter sequence and, by generating acoustic feature parameters that are smoothed by the parameter generation algorithm from the generated distribution sequence, the waveform generation is performed.

Consequently, according to the speech synthesizer of the first embodiment, it is possible to perform waveform generation based on the acoustic feature parameters for which the over-smoothing is reduced as compared with the acoustic feature parameters generated by the conventional HMM speech synthesis, and the speech synthesis that suppresses the concatenation distortion caused by the waveform concatenation or the selection of a single acoustic feature parameter and that suppresses the distortion due to the mismatch of context is made possible, and thus the natural and smooth high-quality speech synthesis is made possible.

Furthermore, according to the speech synthesizer of the first embodiment, by performing the waveform generation based on the acoustic feature parameters obtained by averaging a plurality of acoustic feature parameters, it makes it possible to improve the sense of stability and reduce the concatenation distortion, and thus it is possible to effectively suppress the occurrence of a partially unnatural sound. For example, if the appropriate acoustic feature parameters are not present with respect to the context information on the input text, there is a concern that the sound quality becomes unstable as the mismatch occurs even when the optimal acoustic feature parameters are used. Meanwhile, by the use of a plurality of acoustic feature parameters being averaged, the degree of mismatch is reduced and the concatenation is made smooth. Furthermore, in the speech section in which the concatenation occurs, the possibility that the acoustic feature parameters of adjacent sections are included in the higher-ranked N acoustic feature parameters is increased and, as a result, the difference of the adjacent sections is reduced and the distortion in the concatenation is reduced. When a large number of acoustic feature parameters are averaged, it means that the resultant comes closer to the average value of the HMM sequence, and it approaches the sound quality of the conventional HMM speech synthesis. However, by appropriately setting the number of acoustic feature parameters to be selected, the influence of over-smoothing by averaging is suppressed, and the generation of a balanced synthesized speech is made possible.

In the above-described embodiment, it has been described an example of using the HMM as a statistical model having a plurality of states. However, it is not limited to this example. For example, other models such as a state space model and a conditional random field model may be used. In the above-described embodiment, described has been, as the smoothing method, the parameter generation method based on the likelihood of the static and dynamic feature parameters. However, it is not limited to this example. Other smoothing methods, such as a linear smoothing model of the mean vector of static feature parameters, and a spline smoothing model thereof, may be used, and it may be configured such that the smoothing is performed only between the distribution of the acoustic feature parameters to be connected. Thus, in the first embodiment, it is possible to use various methods of eliminating the distortion of the adjacent acoustic feature parameters, as a smoothing method.

Second Embodiment

Next, the following describes a second embodiment. In the speech synthesizer according to the second embodiment, the configuration of the multiple-acoustic feature parameter sequence generator 103 is different from that of the above-described first embodiment. In the speech synthesizer of the second embodiment, the processing of the multiple-acoustic feature parameter sequence generator 103 generates a multiple-acoustic feature parameter sequence while controlling the number of acoustic feature parameters to select for each speech section by, for example, switching between the speech section for which a plurality of acoustic feature parameters are used and the speech section for which a single optimal acoustic feature parameter is used. This enables the speech synthesis of more realistic voice feeling to be performed while maintaining a sense of stability.

In the following description, the multiple-acoustic feature parameter sequence generator 103 in the second embodiment is distinguished from that of the first embodiment and is referred to as a multiple-acoustic feature parameter sequence generator 103A. Because the other configurations except for the multiple-acoustic feature parameter sequence generator 103A are the same as those in the first embodiment, in the following description, the same reference numerals are given to the same constituent elements as those of the first embodiment and the redundant description is omitted, and only a portion that is characteristic to the second embodiment will be explained.

Figure 24:
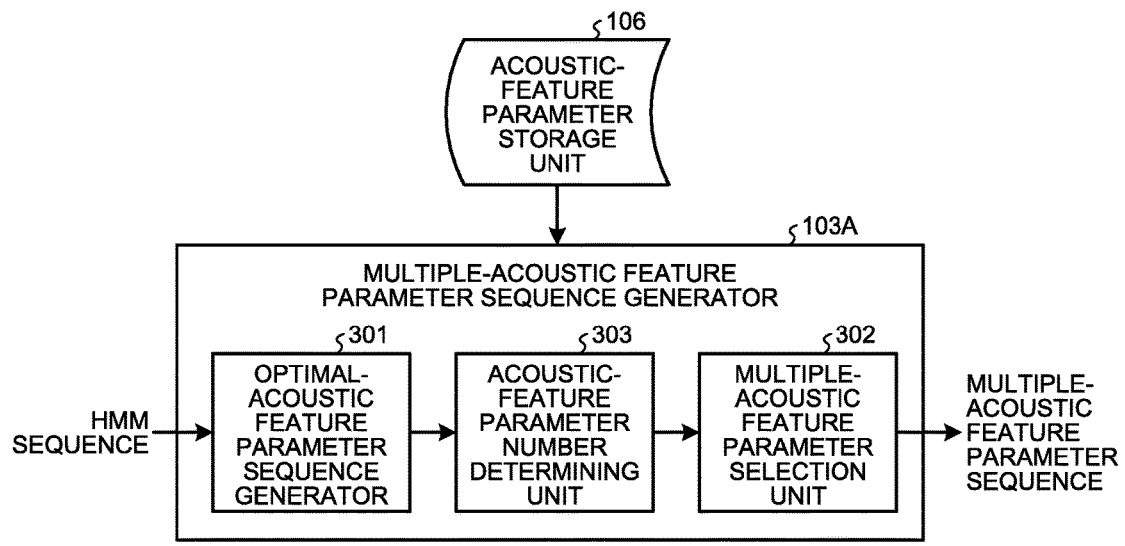
FIG. 24 is a block diagram illustrating an example of another configuration of the multiple-acoustic feature parameter sequence generator.

FIG. 24 is a block diagram illustrating an example of the configuration of the multiple-acoustic feature parameter sequence generator 103A in the second embodiment. In the multiple-acoustic feature parameter sequence generator 103A of the second embodiment, as illustrated in FIG. 24, an acoustic-feature parameter number determining unit 303 is added between the optimal-acoustic feature parameter sequence generator 301 and the multiple-acoustic feature parameter selection unit 302. The multiple-acoustic feature parameter sequence generator 103A in the second embodiment enables, by this configuration, the processing of switching, for each speech section, the number of acoustic feature parameters to be selected for each speech section.

As the number of acoustic feature parameters to be selected, when switching between a single optimal acoustic feature parameter and a predetermined number of acoustic feature parameters, the acoustic-feature parameter number determining unit 303 refers to the optimal acoustic feature parameter of each speech section and determines the number of parameters. Switching of the number of parameters can be performed based on such as the adjacency indicators of the previous and subsequent acoustic feature parameters, the matching degree of key context attribute, or the likelihood of the HMM output distribution at the time of obtaining the optimal-acoustic feature parameter sequence.

That is, it can be switched so as to use only the optimal acoustic feature parameter, in the case that the optimal acoustic feature parameters selected in the optimal-acoustic feature parameter sequence generator 301 is appropriate. Examples of the case that the optimal acoustic feature parameter is appropriate include the case that the context information on the optimal acoustic feature parameter matches up, the case that the optimal acoustic feature parameter adjacent in the original speech data is selected in an adjacent speech section, and the case that the likelihood of the optimal acoustic feature parameter is greater than a certain threshold value.

Figure 25:
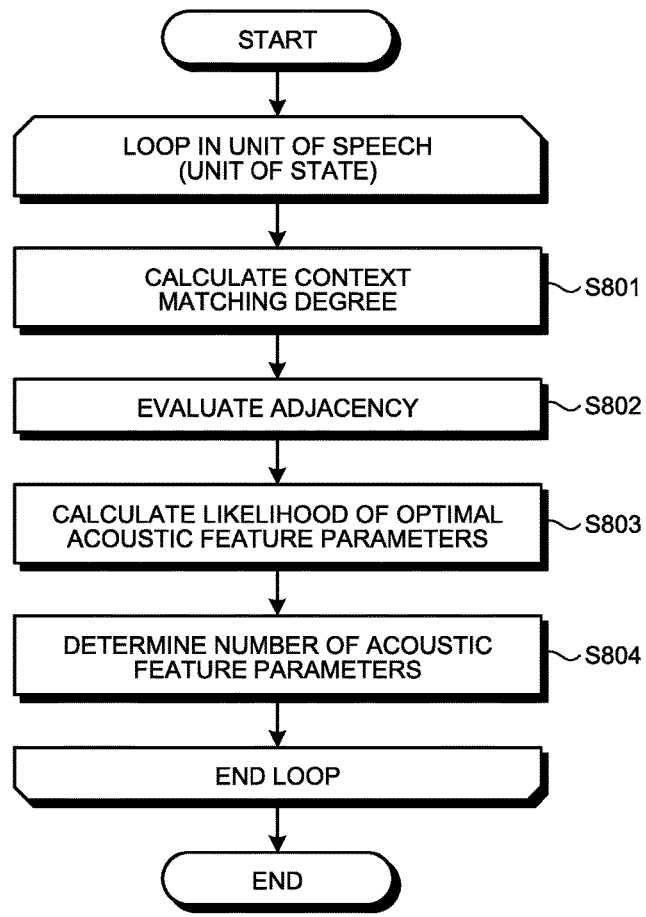
FIG. 25 is a flowchart illustrating a processing procedure of an acoustic-feature parameter number determining unit.

FIG. 25 is a flowchart illustrating one example of a processing procedure of the acoustic-feature parameter number determining unit 303. In the example illustrated in FIG. 25, used for the determination of switching between a single optimal acoustic feature parameter and the predetermined number of acoustic feature parameters is the above-described context matching degree, the adjacency (adjacent indicator), and the likelihood of the optimal acoustic feature parameter. The processing of the acoustic-feature parameter number determining unit 303 illustrated in FIG. 25 loops in unit of a state that is a unit of selecting the acoustic feature parameters (unit of speech section), and determines for each speech section whether to use a single optimal acoustic feature parameter, or to use a predetermined number of acoustic feature parameters.

The acoustic-feature parameter number determining unit 303 first calculates, at Step S801, the context matching degree. The attribute used for calculating the context matching degree can be switched depending on the type of the acoustic feature parameters. For example, in the case of the spectrum envelope parameters, the context matching degree can be calculated by the previous and subsequent phoneme environment, and in the case of the pitch parameters (prosodic feature parameters), the context matching degree can be calculated by the pitch of accent, and the matching degree of the mora number and accent type.

Then, the acoustic-feature parameter number determining unit 303, at Step S802, evaluates the adjacency. It is determined whether the previous and subsequent acoustic feature parameters are also adjacent in the original speech data. The acoustic-feature parameter number determining unit 303, at Step S803, calculates the likelihood of the optimal acoustic feature parameter. The likelihood of the optimal acoustic feature parameter represents the matching degree between the distribution of the HMM and the optimal acoustic feature parameter. In place of the likelihood, a value representing the matching degree of the Zscore may be calculated.

Then, the acoustic-feature parameter number determining unit 303, at Step S804, based on the information obtained from Step S801 to Step S803, determines the number of acoustic feature parameters used in each of the speech sections, that is, determines whether to use a single optimal acoustic feature parameter, or to use a predetermined number of acoustic feature parameters.

The multiple-acoustic feature parameter selection unit 302, in accordance with the number of parameters determined by the acoustic-feature parameter number determining unit 303, performs the selection of the acoustic feature parameters for each speech section, and generates a multiple-acoustic feature parameter sequence. That is, the multiple-acoustic feature parameter selection unit 302, for the speech section for which a single optimal acoustic feature parameter is used, selects the optimal acoustic feature parameter of the optimal-acoustic feature parameter sequence, and for the speech section for which a plurality of acoustic feature parameters is used, selects the predetermined number of the acoustic feature parameters, and generates the multiple-acoustic feature parameter sequence.

In the second embodiment, it has been configured such that the number of acoustic feature parameters is determined for each speech section. However, it may be configured such that, by setting a weight that is obtained from such as the ratio of the likelihood of each acoustic feature parameter for a plurality of acoustic feature parameters selected for each speech section, it is obtained as a weighted sum when determining a mean vector in the distribution sequence generator 501 of the waveform generator 104, for example. In the processing for each speech section, there is no need to switch by the information only on a speech section alone. It is also possible to perform the processing such as generating the pitch based on the optimal acoustic feature parameter when the whole accent phrase is selected from the same speech data in the speech corpus 201 and when the mora number and accent type match, and generating the spectrum envelope parameters based on the optimal acoustic feature parameters when the phoneme sequence matches.

In the second embodiment, the distribution sequence generator 501 of the waveform generator 104 generates a distribution sequence from the optimal acoustic feature parameter or a plurality of acoustic feature parameters selected for each speech section. Then, the acoustic-feature parameter generator 502 generates the acoustic feature parameters used for waveform generation from this distribution sequence. The distribution sequence generator 501 is, when a plurality of acoustic feature parameters are selected, capable of generating the distribution sequence based on the mean vector thereof, and when a single optimal acoustic feature parameter is selected, capable of generating it by defining the optimal acoustic feature parameter as the mean vector. The variance can be generated, when a plurality of acoustic feature parameter are selected, from these acoustic feature parameters, and alternatively, the variance of the HMM distribution may be used. Furthermore, when a single optimal acoustic feature parameter is selected, the distribution can be generated based on a certain minimum variance value.

From the distribution sequence thus generated, the acoustic feature parameters to be used for waveform generation in the acoustic-feature parameter generator 502 are generated. At this time, the acoustic-feature parameter generator 502 emphasizes, by performing formant emphasis processing with a post filter for only the speech section for which a plurality of acoustic feature parameters are used, ambiguous formants that are caused when averaged, while not applying such processing to the speech section for which a single optimal acoustic feature parameter is used. Thus, the acoustic feature parameters of low distortion can be generated. Then, the excitation waveform is generated by the excitation generator 503 from the pitch and the excitation feature parameters, and the waveform generation is performed by the speech waveform generator 504.

As in the foregoing, in the second embodiment, in the multiple-acoustic feature parameter sequence generator 103A, whether to use the optimal acoustic feature parameter or to use the multiple acoustic feature parameters is switched by the acoustic-feature parameter number determining unit 303. This configuration, according to the speech synthesizer of the second embodiment, enables the synthesized speech of further partially high real voice feeling to be generated while maintaining the sense of stability. For example, when a large-scale corpus is available as the speech corpus 201, the possibility that the speech data similar to the input text is stored in advance is high. In such a case, a stable synthesized speech can be obtained even when a similar speech is not present while suppressing the amount of deformation from the speech data.

Furthermore, according to the second embodiment, it is also possible to switch so as to use the speech waveform as is, when the mora number, accent type, and reading text string match, for example, and that makes it possible to perform speech synthesis in the configuration in which the sound quality that resembles the speech data is obtainable for the prepared sentence.

The speech synthesizer of the first embodiment and the speech synthesizer of the second embodiment in the foregoing can be implemented also based on a general-purpose computer device as basic hardware, for example. That is, each of the processing illustrated in the flowchart of FIG. 10 can be implemented by executing a computer program on a processor mounted on the above-described computer device. At this time, the speech synthesizer may be implemented by installing the above-described computer program in the computer device in advance, or may be implemented by storing the computer program in a storage medium such as a CD-ROM or distributing the computer program via a network, and by appropriately installing the computer program into the computer device. Furthermore, it can be implemented by appropriately using a memory, a hard disk, or a storage medium, such as CD-R, CD-RW, DVD-RAM, and DVD-R, which are built in or externally connected to the above-described computer device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech synthesizer comprising:
   a statistical-model sequence generator, implemented in computer hardware, configured to generate, based at least in part on context information corresponding to an input text, a statistical model sequence that comprises a first sequence of a statistical model comprising a plurality of states;
   a multiple-acoustic feature parameter sequence generator, implemented in computer hardware, configured to, for each speech section corresponding to each state of the statistical model sequence, select a first plurality of acoustic feature parameters for each kind of acoustic features including a prosodic feature, an excitation feature, and a spectrum feature, from a first set of acoustic feature parameters extracted from a first speech waveform stored in a speech database and generate a multiple-acoustic feature parameter sequence for each kind of the acoustic features, the multiple-acoustic feature parameter sequence comprising a sequence of the first plurality of acoustic feature parameters; and
   a waveform generator, implemented in computer hardware, configured to generate a distribution sequence based at least in part on the multiple-acoustic feature parameter sequence for each kind of the acoustic features and generate a second speech waveform based at least in part on a second set of acoustic feature parameters generated based at least in part on the distribution sequence without concatenation of waveform units, wherein:
      the multiple-acoustic feature parameter sequence generator determines, for each speech section, whether to use a single optimal acoustic feature parameter or to use the first plurality of acoustic feature parameters, and
      the waveform generator generates the distribution sequence based at least in part on a mean vector of the first plurality of acoustic feature parameters on a speech section for which the first plurality of acoustic feature parameters are used, and based at least in part on an optimal acoustic feature parameter as the mean vector on the speech section for which the single optimal acoustic feature parameter is used.

2. The speech synthesizer according to claim 1, wherein the waveform generator determines a number of frames for each state of the statistical model sequence, associates a second plurality of acoustic feature parameters included in the multiple-acoustic feature parameter sequence with each frame, and generates the distribution sequence based at least in part on a mean vector of the second plurality of acoustic feature parameters associated with each frame.

3. The speech synthesizer according to claim 1, wherein the waveform generator generates smoothing acoustic feature parameters for which a distortion caused with previous and/or subsequent acoustic feature parameters is reduced as the second set of acoustic feature parameters generated based at least in part on the distribution sequence, and generates the second speech waveform based at least in part on the smoothing acoustic feature parameters.

4. The speech synthesizer according to claim 3, wherein the second set of acoustic feature parameters included in the multiple-acoustic feature parameter sequence each comprise static feature parameters and dynamic feature parameters, and
   the waveform generator generates the smoothing acoustic feature parameters based at least in part on distribution sequences of the static feature parameters and the dynamic feature parameters.

5. The speech synthesizer according to claim 1, wherein the multiple-acoustic feature parameter sequence generator calculates a likelihood for candidates of the first plurality of acoustic feature parameters selected for each speech section based at least in part on the statistical model sequence, and selects the first plurality of acoustic feature parameters for each speech section based at least in part on the likelihood.

6. The speech synthesizer according to claim 5, wherein the multiple-acoustic feature parameter sequence generator performs a ranking on the candidates of the first plurality of acoustic feature parameters selected for each speech section based at least in part on the likelihood, and selects the N highest ranked acoustic feature parameters for each speech section.

7. The speech synthesizer according to claim 5, wherein the multiple-acoustic feature parameter sequence generator calculates, as the likelihood, a target likelihood that represents a degree of matching a target of a speech section and a concatenation likelihood that represents a degree of matching as a subsequent or preceding speech section with respect to adjacent speech sections, and selects the first plurality of acoustic feature parameters for each speech section based at least in part on the target likelihood and the concatenation likelihood.

8. The speech synthesizer according to claim 7, wherein the multiple-acoustic feature parameter sequence generator generates, based at least in part on the statistical model sequence, an optimal-acoustic feature parameter sequence comprising a sequence of optimal acoustic feature parameters selected in each speech section; and performs the ranking on the candidates of the first plurality of acoustic feature parameters selected for each speech section based at least in part on the concatenation likelihood from the optimal acoustic feature parameter of the preceding speech section, the target likelihood on a statistical model corresponding to the relevant speech section, and the concatenation likelihood to the optimal acoustic feature parameter of the subsequent speech section; and selects a particular number of the higher-ranked acoustic feature parameters for each speech section.

9. The speech synthesizer according to claim 1, wherein the multiple-acoustic feature parameter sequence generator calculates, for candidates of the first plurality of acoustic feature parameters selected for each speech section, an adjacency indicator that indicates whether the candidates are adjacent to a third acoustic feature parameter of a preceding speech section in the first speech waveform stored in the speech database; and selects preferentially, based at least in part on the adjacency indicator, the first set of acoustic feature parameters that are adjacent to the third acoustic feature parameter of the preceding speech section in the first speech waveform stored in the speech database.

10. The speech synthesizer according to claim 1, wherein the multiple-acoustic feature parameter sequence generator determines whether to use the single optimal acoustic feature parameter or to use the first plurality of acoustic feature parameters, based at least in part on at least one of a likelihood of the optimal acoustic feature parameter, an adjacency indicator that indicates whether the optimal acoustic feature parameter is adjacent to a third acoustic feature parameter of a preceding speech section in the first speech waveform stored in the speech database, and a context matching degree that indicates a degree of matching context information on the optimal acoustic feature parameter.

11. The speech synthesizer according to claim 1, further comprising:
a statistical model storage configured to store therein decision trees of states of the statistical model, and output distributions of leaf nodes of the decision trees, as statistical model information; and
an acoustic feature parameter storage configured to store therein the first set of acoustic feature parameters extracted from the first speech waveform stored in the speech database together with information indicative of the leaf nodes of the decision tree used in generating the statistical model information, wherein
the statistical model sequence generator determines, for each speech section, a first output distribution of the statistical model sequence by a second output distribution of the leaf nodes that is determined at least by traversing the decision tree based at least in part on context information, and
the multiple-acoustic feature parameter sequence generator selects each leaf node or an upper node of each leaf node, and defines a third set of acoustic feature parameters associated with nodes below the upper node as candidates of the first plurality of acoustic feature parameters to be selected for each speech section.

12. The speech synthesizer according to claim 1, wherein the statistical model is trained based at least in part on the first set of acoustic feature parameters extracted from the first speech waveform stored in the speech database.

13. The speech synthesizer according to claim 1, wherein the acoustic feature parameter comprises a spectrum envelope parameter that represents spectrum information on the first speech waveform, an excitation parameter that represents information of excitation signals, and a prosodic feature parameter that represents prosodic information.

14. A speech synthesis method executed in a speech synthesizer, the speech synthesis method comprising:
generating, based at least in part on context information corresponding to an input text, a statistical model sequence that comprises a first sequence of a statistical model comprising a plurality of states;
selecting a first plurality of acoustic feature parameters for each kind of acoustic features including a prosodic feature, an excitation feature, and a spectrum feature, from a first set of acoustic feature parameters extracted from a first speech waveform stored in a speech database and generating a multiple-acoustic feature parameter sequence for each kind of the acoustic features, the multiple-acoustic feature parameter sequence comprising a sequence of the selected first plurality of acoustic feature parameters, for each speech section corresponding to each state of the statistical model sequence; and
generating a distribution sequence based at least in part on the multiple-acoustic feature parameter sequence for each kind of the acoustic features and generating a second speech waveform based at least in part on a second set of acoustic feature parameters generated from the distribution sequence without concatenation of waveform units, wherein:
the generating of the multiple-acoustic feature parameter sequence determines, for each speech section, whether to use a single optimal acoustic feature parameter or to use the first plurality of acoustic feature parameters, and
the generating of the distribution sequence generates the distribution sequence based at least in part on a mean vector of the first plurality of acoustic feature parameters on a speech section for which the first plurality of acoustic feature parameters are used, and based at least in part on an optimal acoustic feature parameter as the mean vector on the speech section for which the single optimal acoustic feature parameter is used.

15. A computer program product comprising a non-transitory computer-readable medium that stores therein a computer program that causes a computer to execute:
generating, based at least in part on context information corresponding to an input text, a statistical model sequence that comprises a first sequence of a statistical model comprising a plurality of states;
selecting a first plurality of acoustic feature parameters for each kind of acoustic features including a prosodic feature, an excitation feature, and a spectrum feature, from a first set of acoustic feature parameters extracted from a first speech waveform stored in a speech database and generating a multiple-acoustic feature parameter sequence for each kind of the acoustic features, the multiple-acoustic feature parameter sequence comprising a sequence of the selected plurality acoustic feature parameters, for each speech section corresponding to each state of the statistical model sequence; and generating a distribution sequence based at least in part on the multiple-acoustic feature parameter sequence for each kind of the acoustic features and generating a second speech waveform based at least in part on a second set of acoustic feature parameters generated from the distribution sequence without concatenation of waveform units, wherein the generating of the multiple-acoustic feature parameter sequence determines, for each speech section, whether to use a single optimal acoustic feature parameter or to use the first plurality of acoustic feature parameters, and the generating of the distribution sequence generates the distribution sequence based at least in part on a mean vector of the first plurality of acoustic feature parameters on a speech section for which the first plurality of acoustic feature parameters are used, and based at least in part on an optimal acoustic feature parameter as the mean vector on the speech section for which the single optimal acoustic feature parameter is used.

* * * * *